United States Patent
Umetsu et al.

[11] Patent Number: 5,815,659
[45] Date of Patent: Sep. 29, 1998

[54] NETWORK DATA SERVER FOR USE WITH PROGRAMMABLE LOGIC CONTROLLERS AND PROGRAMMABLE LOGIC CONTROLLER SYSTEM FORMED USING SUCH NETWORK DATA SERVERS

[75] Inventors: Minoru Umetsu; Koji Morita; Toshiyuki Takase, all of Tokyo, Japan

[73] Assignee: Mitsubishi Denki Kabushiki Kaisha, Tokyo, Japan

[21] Appl. No.: 583,502

[22] Filed: Jan. 5, 1996

[30] Foreign Application Priority Data

Jun. 7, 1995 [JP] Japan .................................. 7-140508

[51] Int. Cl.⁶ .................................................. G06F 13/00
[52] U.S. Cl. ............................... 395/200.33; 395/200.43; 395/200.46; 395/200.49; 395/200.59; 364/DIG. 1
[58] Field of Search .................. 395/200, 200.33, 395/200.43, 200.46, 200.49, 200.59; 364/468.17, DIG. 1

[56] References Cited

U.S. PATENT DOCUMENTS

| | | | |
|---|---|---|---|
| 4,539,636 | 9/1985 | Sääksjärvi | 395/421.01 |
| 4,719,562 | 1/1988 | Bailly et al. | 364/222.2 |
| 5,142,469 | 8/1992 | Weisenborn | 364/146 |
| 5,185,708 | 2/1993 | Hall et al. | 364/550 |
| 5,461,721 | 10/1995 | Cormier et al. | 395/275 |
| 5,600,806 | 2/1997 | Brown et al. | 395/380 |
| 5,642,515 | 6/1997 | Jones et al. | 395/727 |

FOREIGN PATENT DOCUMENTS 2080582  2/1982  European Pat. Off. .

OTHER PUBLICATIONS

Patent Abstracts of Japan, No. 5–191409, Jul. 30, 1993.
Patent Abstracts of Japan, No. 1–41052, Mar. 13, 1989.
Patent Abstracts of Japan, No. 3–16444, Jan. 24, 1991.
Patent Abstracts of Japan, No. 62–73355, Apr. 4, 1987.
Patent Abstracts of Japan, No. 5–265952, Oct. 15, 1993.

*Primary Examiner*—Daniel H. Pan
*Assistant Examiner*—Dzung C. Nguyen
*Attorney, Agent, or Firm*—Sughrue, Mion, Zinn, Macpeak & Seas, PLLC

[57] ABSTRACT

A network data server apparatus is connected to a plurality units of PLC $3_1$ to $3_n$ as well as to at least one unit of FA controller in a manner enabling bidirectional communications. Provided in the network data server apparatus are a memory for PLC enabling read/write of PLC data and a copy data list section with memory addresses from which data is copied and those at which data is copied described therein, and data copying is executed by a control means according to the memory addresses from which data is copied and those at which the data is copied.

7 Claims, 30 Drawing Sheets

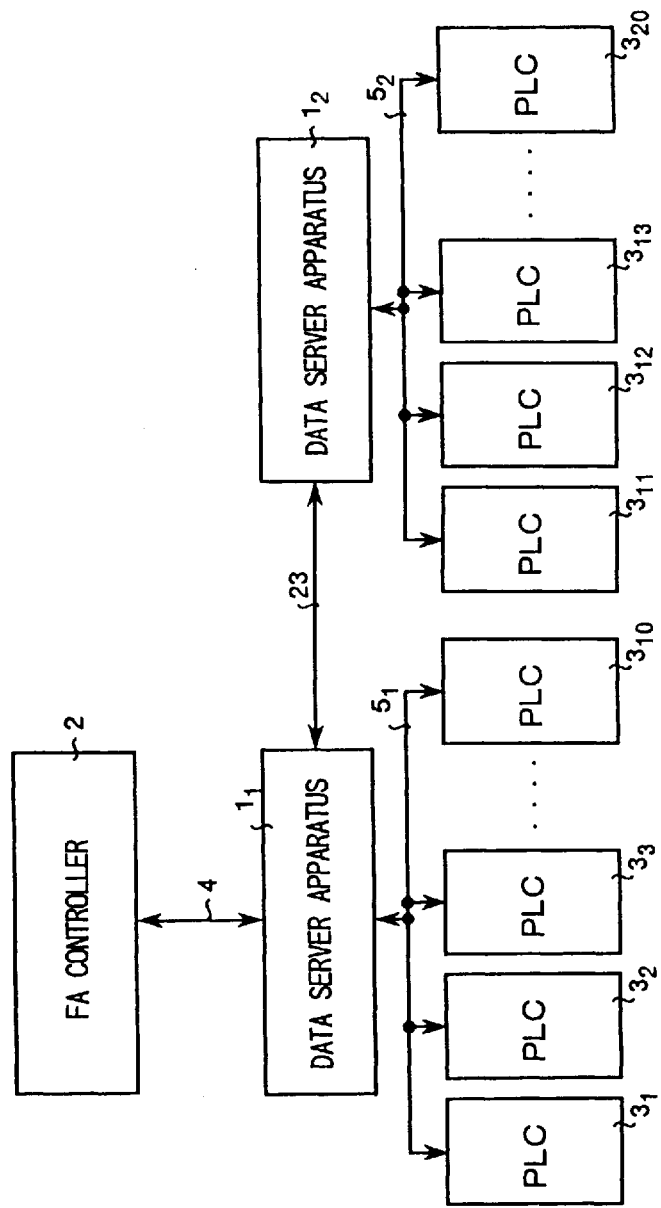
F I G. 6

F I G. 1 6
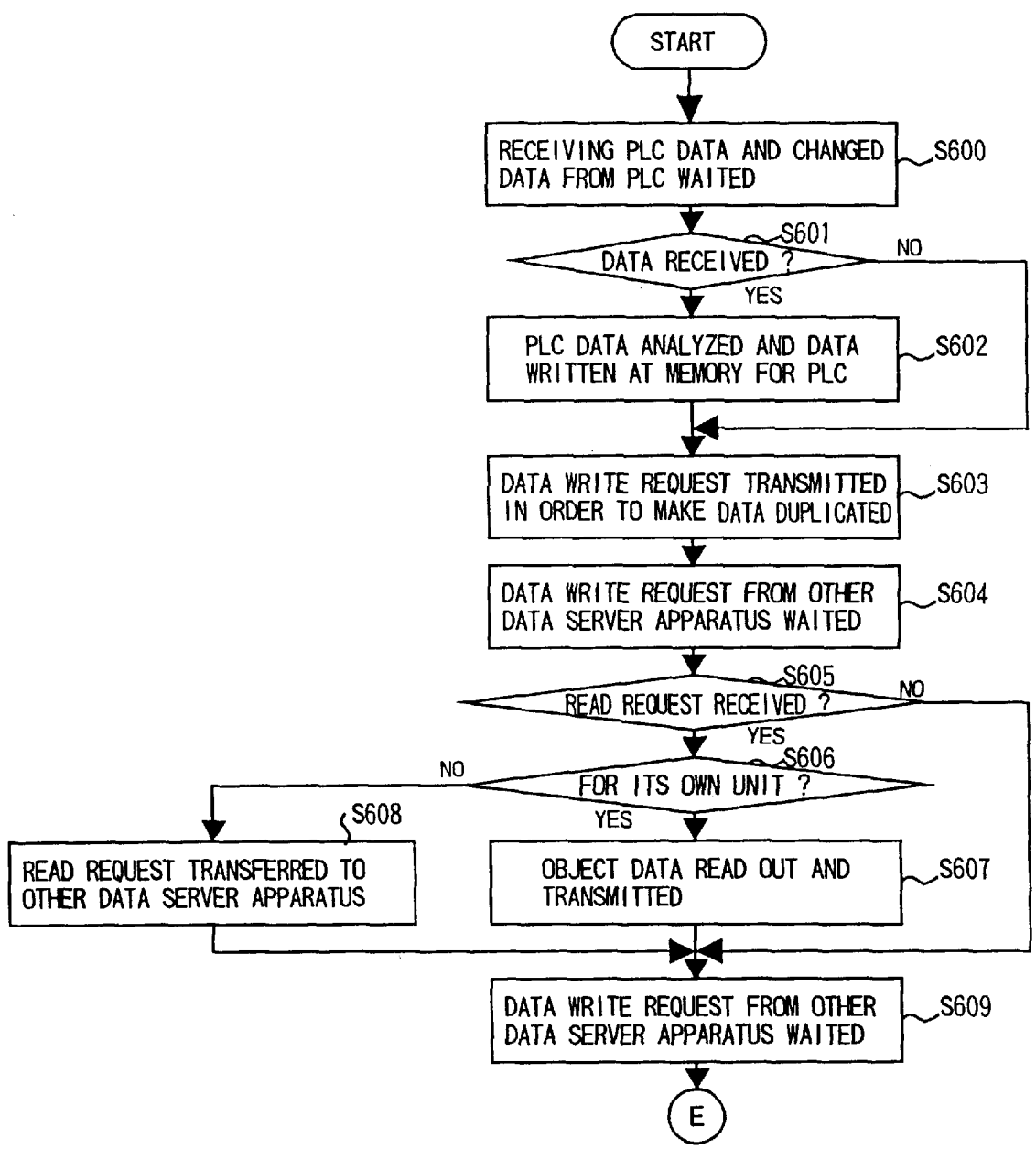

NETWORK DATA SERVER FOR USE WITH PROGRAMMABLE LOGIC CONTROLLERS AND PROGRAMMABLE LOGIC CONTROLLER SYSTEM FORMED USING SUCH NETWORK DATA SERVERS

FIELD OF THE INVENTION

The present invention relates to a network data server apparatus for storing therein data for a plurality units of program processing means such as programmable logic controllers, and more particularly to a network data server apparatus and a programmable logic controller system in a system in which an FA controller and a programmable logic controller are connected thereto.

BACKGROUND OF THE INVENTION

FIG. 30 shows a conventional system of a system having a plurality units of programmable logic controller. In FIG. 30, the reference numeral 100 indicates an FA controller, and 101 to 104 indicate a programmable logic controller (described PLC hereinafter) respectively, and the FA controller 100 is connected to the PLCs 101 to 104 so that bidirectional communications can be executed through a communication path 105, and the FA controller 100 executes 1 vs N communications with the PLCs 101 to 104 by having one task operated and stores data for the PLCs 101 to 104 in a memory so that the data can be read out therefrom or written therein.

In this system, when data for one PLC connected to the FA controller 100 is copied to other PLC, the FA controller 100 issues a data request to the PLC from which the data is copied, reads and receives the data from a device memory in the PLC, and transmits the received data to the other PLC.

When copying data from a PLC to another PLC according to the sequence as described above, it is necessary for the FA controller to store therein data such as an address of each PLC, so that memory resources in the FA controller can not be saved.

In the FA controller, different from, for instance, a computer used for office automation, a frequency of system change is high, and a communication program for the FA controller may be changed each time the system is changed. For this reason, for instance, the production line is kept down for a long time, which in turn lowers an operating ratio of the production line.

Also, the FA controller is required to read out data from a PLC or write data in a PLC each time data is copied, so that a long time is required for copying data and work load to the FA controller is very large.

SUMMARY OF THE INVENTION

It is an object of the invention to provide a network data server apparatus and a programmable logic controller wherein an operation for copying data for a program processing means such as a PLC can accurately be executed with high responsivity and without depending on a task by an FA controller, the FA controller is not required to store therein data such as an address of each PLC and can run a production line or the like even when a system for the FA controller is changed, data for each program processing means is put under monolithic management so that the data can be read out or written in easily, and also transparent data transfer, data duplication, and improvement of efficiency of the entire system can be achieved.

In the network data server apparatus according to the present invention, when data is received from a first program processing means due to change of data for the first program processing means connected to the network data server, the write means writes the data into the memory, and data in the memory is updated. Also, when data in the memory is changed, the data is read out from the memory with the read means, and is transmitted to the program processing means.

With this feature, data each for the first and second program processing means is controlled monolithically at the network data server apparatus.

When data is copied, data written at a memory address in a memory is read out from the memory with the read means and the data is written at a memory address in a memory storing data for other program processing means with the write means according to memory addresses from which data is copied and those at which data is copied, each described in a copy data list section, thus data copying being complete.

With this feature, data copying is accurately executed with a quick response and without depending on any task of other controller.

In another network data server apparatus according to the present invention, when data is received from PLC due to change of data in the device memory in PLC connected to the network data server apparatus, the write means writes the data into a memory for PLC and data in the memory for PLC is updated. On the contrary, when data in the memory for PLC has been changed due to a result of receiving data from the FA controller and writing the data into the memory for PLC with the write means, the data is read out from the memory for PLC with the read means and transmitted to the corresponding PLC.

With this feature, data for each programmable logic controller is controlled monolithically in the network data server apparatus.

When data is copied, data for the programmable logic controller written at a memory address in a memory for PLC is read out from the memory for PLC with the read means, the data is written at a memory address in the memory for PLC storing data for other programmable logic controller with the write means, according to memory addresses from which data is copied and those at which data is copied, each described in the copy data list section, thus data copying being complete.

With this feature, data copying is accurately executed with a quick response and without depending on any tasks of the FA controller.

In another network data server apparatus according to the present invention, in a system in which a plurality units of the network data server apparatuses are provided with a programmable logic controller connected to each of the network data server apparatuses, data copying is executed in an extended range between network data server apparatuses according to memory addresses from which data is copied and those at which data is copied, each described in the copy data list section, the data copying between the network data server apparatuses is also accurately executed with a quick response and without depending on any task of the FA controller.

In another network data server apparatus according to the present invention, in a system in which a plurality units of the network data server apparatuses are provided with a programmable logic controller connected to each of the network data server apparatuses and an FA controller is connected to one of the plurality units of the network data server apparatuses, when a data read/write request is received from the FA controller, the control means determines whether the data read/write request is issued to any programmable logic controller connected to the network data server apparatus or not by referring to list contents of the connected PLC list section, executes the request by itself if the data read/write request is for a programmable logic controller connected to the network data server apparatus, and transfers the data read/write request with the transmitting means to other network data server apparatus if the data read/write request is not for a programmable logic controller connected to the network data server apparatus.

With this feature, the network data server apparatus not connected to the FA controller receives and transmits data from and to the FA controller through the network data server apparatus connected to the FA controller, and receiving and transmitting of the data are executed by referring to list contents in the connection PLC list section which the network data server apparatus stores therein, so that the FA controller executes transparent data transmission with each of the network data server apparatuses.

In another network data server apparatus according to the present invention, in a system in which a plurality units of the network data server apparatuses are provided with a programmable logic controller connected to each of the network data server apparatuses, data for a programmable logic controller connected to other network data server apparatus is transmitted to or received from by means of communications between the network data server apparatuses with the transmitting means as well as the receiving means, and data for a programmable logic controller connected to other network data server apparatus is written into the memory for PLC, thus data being duplicated.

In another network data server apparatus according to the present invention, in a system in which a plurality units of the network data server apparatuses are provided with a programmable logic controller connected to each of the network data server apparatuses, data to be stored in the memory for PLC of the network data server apparatus is decided according to the storage medium data written in the storage medium data memory, PLC data storage data indicating this decision, namely which of the network data server apparatus stores therein each data, is stored in the PLC data storage data memory, and the data is either written into the memory for PLC in the network data server apparatus or transmitted to other network data server apparatus according to PLC data storage data stored in this PLC data storage data memory.

With this feature, data suited to characteristics of the storage medium constituting the memory for PLC is selected for each memory for PLC and the data is written into the memory for PLC. For instance, data having a short cycle time for changing is written into the storage medium with a quick operating speed, while data having a long cycle time for changing is written into a storage medium with a slow operating speed, so that effective utilization of memory resources and improvement in performance of the whole system can be achieved.

In another programmable logic controller system according to the present invention, a data server managing unit is provided, and when the network data server apparatus receives data from the programmable logic controller, the system executes communication inquiring destination for storing data to the data server managing unit, and the data server managing unit distributes and allocates data for each programmable logic controller to network data server apparatuses for storing data for each programmable logic controller according to storage medium data written in the storage medium data memory by means of the communication for inquiring, writes PLC data storage data decided through the distribution and allocation described above in a PLC data storage data memory, reads out the corresponding PLC data storage data from the PLC data storage data memory each time communication inquiring destination for storing data from said network data server apparatus to decide the destination for storage of the data, and transmits the data concerning the destination for data storage to a station having issued the inquiry. The network data server apparatus either writes, when a response from the data server control unit, namely the data concerning the destination for data storage is received, the data into the memory for PLC of the network data server apparatus, or transmits the data to other network data server apparatus.

With this feature, data suited to characteristics of each storage medium constituting the memory for PLC is selected for each of the memories for PLC and written into the memory for PLC, so that effective utilization of memory resources and improvement in performance of a whole system can be achieved. Distribution and allocation of data to the network data server apparatuses each storing data therein and a notice of the destination for data storage are executed monolithically in the data server control unit, so that system performance is improved as compared to a case where these operations are executed respectively in each of the network data server apparatuses.

Other objects and features of this invention will become understood from the following description with reference to the accompanying drawings.

BRIEF DESCRIPTION OF THE DRAWINGS

FIG. 6 is a general block diagram showing the PLC system including the network data server apparatus according to the present invention common to Embodiments 1 to 4;

FIG. 16 is a flow chart showing the first half portion of an operation flow in Embodiment 3 of the network data server apparatus in the side with the FA controller according to the present invention not connected thereto;

DESCRIPTION OF THE PREFERRED EMBODIMENTS

Figure 1:
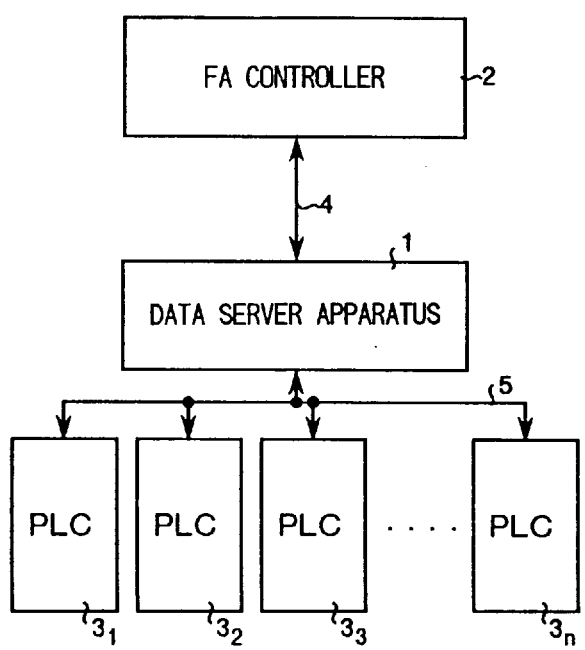
FIG. 1 is a general block diagram showing Embodiment 1 of the PLC system including the network data server apparatus according to the present invention.
Figure 2:
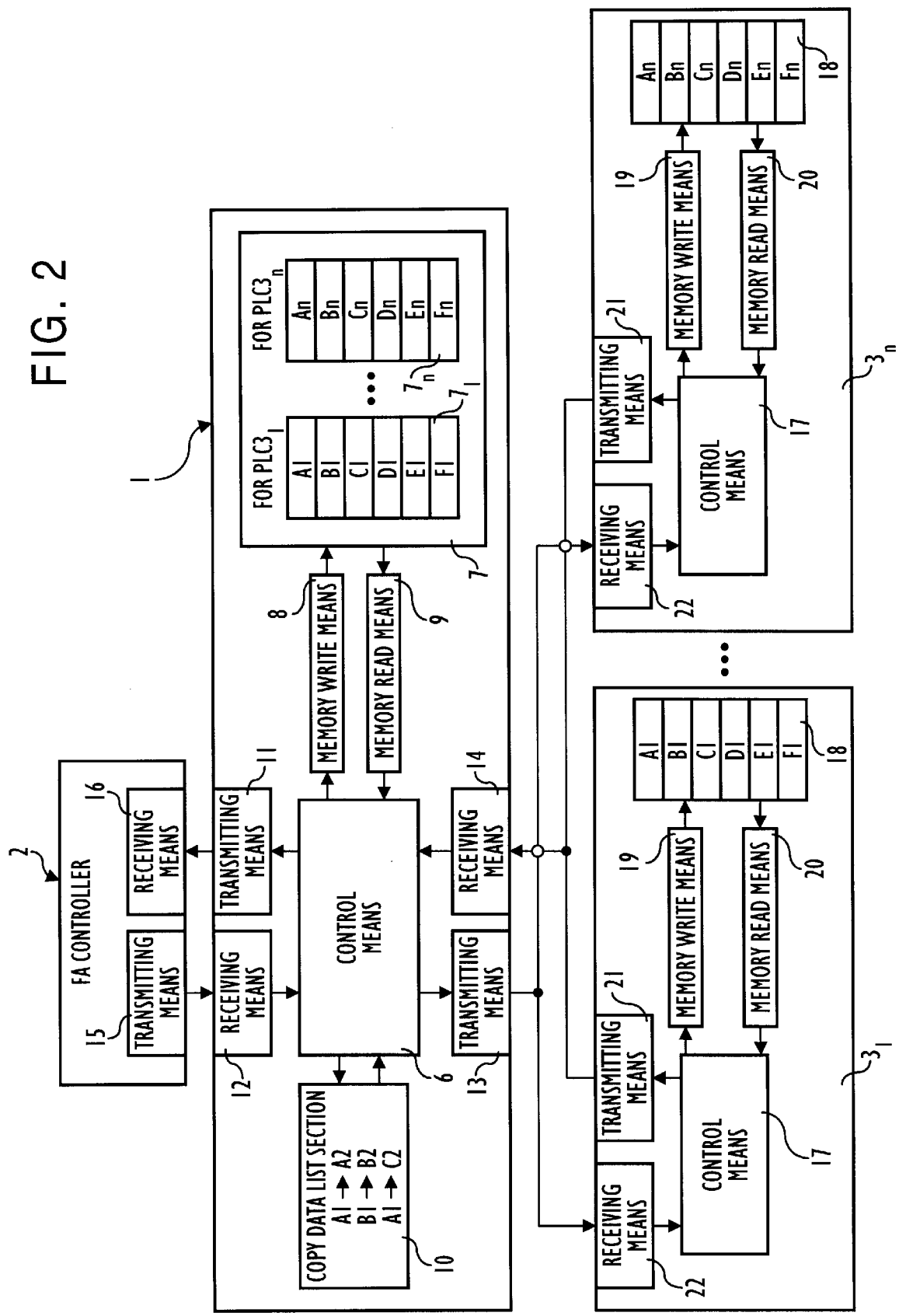
FIG. 2 is a block diagram showing Embodiment 1 of the network data server apparatus according to the present invention.

FIG. 1 and FIG. 2 show Embodiment 1 of a PLC system including the network data server apparatus according to the present invention respectively. In FIG. 1, designated at the reference numeral 1 is a network data server apparatus, at 2 an FA controller, at $3_1$ to $3_n$. each PLCs respectively, and the network data server apparatus 1 and the FA controller 2 are connected to each other in a manner enabling bidirectional communications through the communication path 4, while the network data server apparatus 1 and PLCs $3_1$ to $3_n$ are connected to each other in a manner enabling bidirectional communications through the communication path 5.

As shown in FIG. 2, the network data server apparatus 1 comprises a control means 6, a memory 7 for PLC, a memory write means 8 for writing data in the memory 7 for PLC, a memory read means 9 for reading out data from the memory for PLC, a copy data list section 10, a transmitting means 11 as well as receiving means 12 for communication with the FA controller 2, and a transmitting means 13 as well as a receiving means 14 for communication with the PLCs $3_1$ to $3_n$.

The memory 7 for PLC stores each data for each of PLCs $3_1$ to $3_n$ at specified memory addresses thereof, and herein the memory regions $7_1$ to $7_n$ are set for each PLCs $3_1$ to $3_n$ respectively, and memory addresses set in those memory regions $7_1$ to $7_n$, are the same as the memory addresses $A_1$ to $F_l$ ... $A_n$ to $F_n$ in the device memory 18 described later for each of PLCs $3_1$ to $3_n$.

The copy data list section 10 has a list in which memory addresses from which data is copied and those at which data is copied are described therein. In FIG. 2, there are three cases of data copy data, and in the first case, the memory address $A_1$ in the memory region $7_1$ indicates the memory address from which data is copied, while the memory address $A_2$ in the memory region $7_2$ indicates the memory address at which data is copied.

The control means 6 controls operations of the memory write means 8, memory read means 9, transmitting means 11 and 13, and receiving means 12 and 14, and also provides controls to write data at a specified memory address in the memory 7 for PLC with the memory write means 8 according to a read/write request received from the FA controller 2 with the receiving means 12, to read out required data from the memory 7 for PLC with the memory read means 9 and transmit the data to the FA controller with the transmitting means 11, and also provides controls to read out the data from the memory 7 for PLC with the memory read means 9 and transmit the data to corresponding PLCs $3_1$ to $3_n$ with the transmitting means 13 when any change in the data written in the memory 7 for PLC occurs, and also to receive data from the PLCs $3_1$ to $3_n$ and write the data at a specified memory address in the memory 7 for PLC with the memory write means 8.

Also, the control means 6 provides controls to read out the data written in the memory address from which data is copied in the memory 7 for PLC from the memory 7 for PLC with the memory read means 9 according to the memory addresses from which data is copied and those at which data is copied, each described in the copy data list section 10, and to write the data in the memory address at which data is copied in the memory 7 for PLC with the memory write means 8.

The FA controller 2 has a transmitting means 15 as well as a receiving means 16 each for communication with the network data server apparatus 1.

The PLCs $3_1$ to $3_n$ each have a control means 17, a device memory 18, a memory write means 19 for writing data in the device memory 18, a memory read means 20 for reading out data from the device memory 18, and a transmitting means 21 as well as a receiving means 22 each for communication with the network data server apparatus 1.

The control means 17 provides controls to write data received from the network data server apparatus 1 with the receiving means 22 into the device memory 18 with the memory write means 19, to read out the data from the device memory 18 with the memory read means 20 if the data in the device memory 18 has been changed, and to transmit the data to the network data server apparatus 1 with the transmitting means 21.

Figure 3:
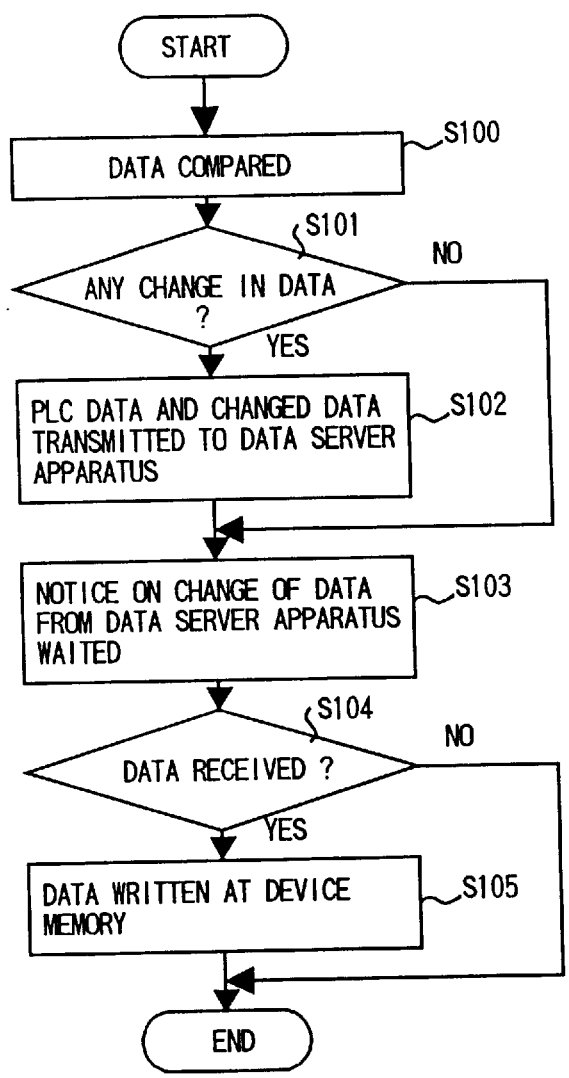
FIG. 3 is a flow chart showing an operating flow of a PLC in the PLC system including the network data server apparatus according to the present invention.
Figure 4:
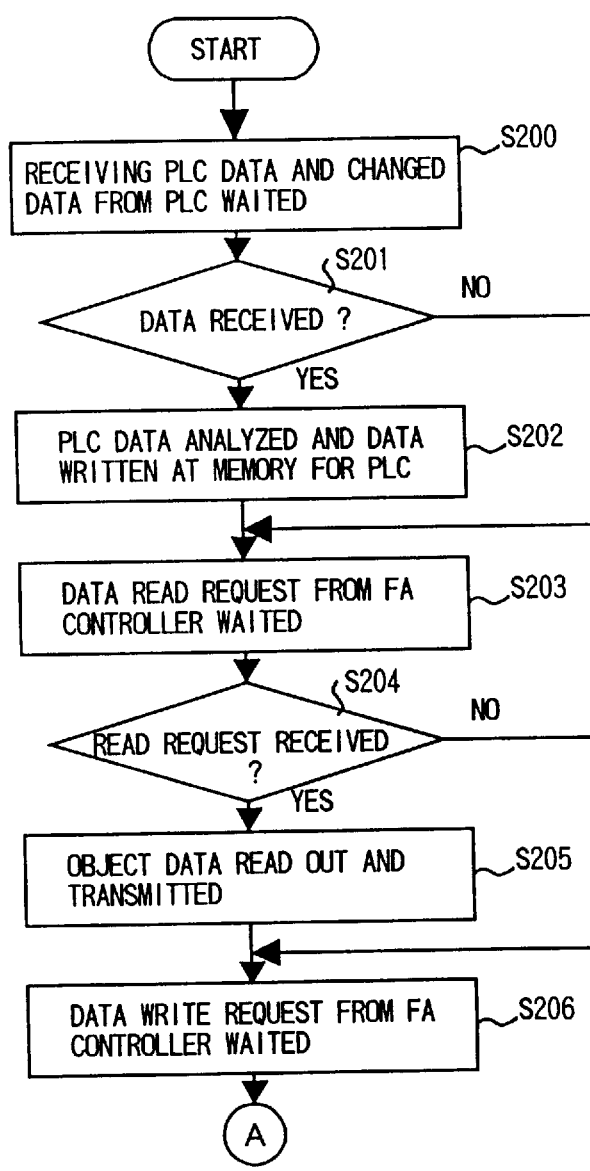
FIG. 4 is a flow chart showing the first half portion of an operation flow in Embodiment 1 of the network data server apparatus according to the present invention.
Figure 5:
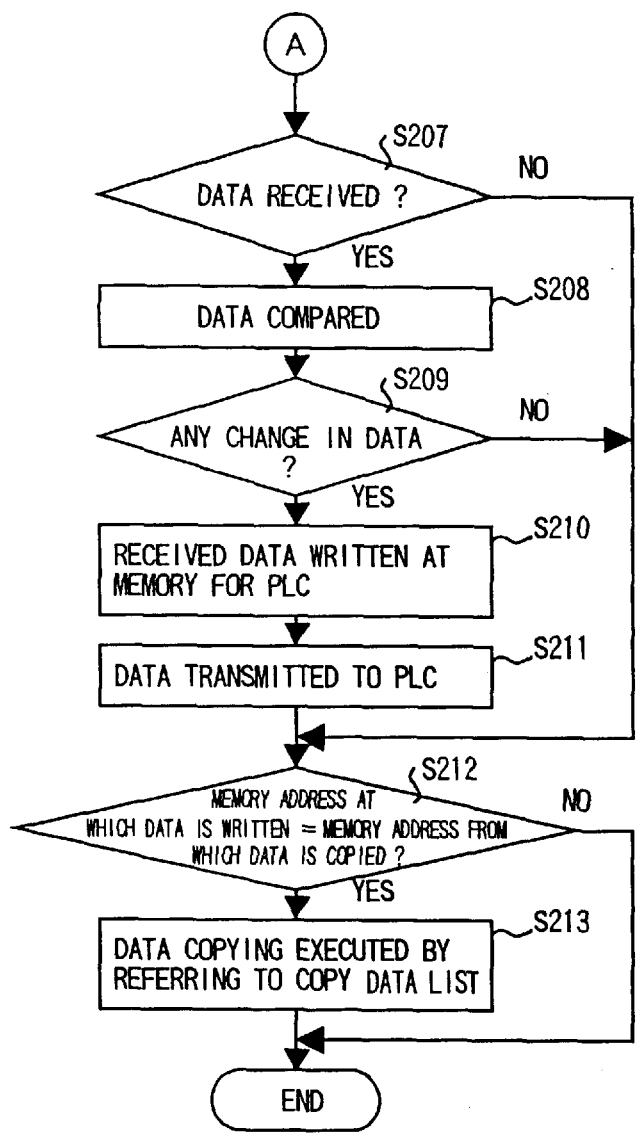
FIG. 5 is a flow chart showing the latter half portion of the operation flow in Embodiment 1 of the network data server apparatus according to the present invention.

Next, a description is made for operations in Embodiment 1 with reference to FIG. 3 to FIG. 5.

FIG. 3 shows an operation flow in a PLC. This operation flow is repeatedly executed once for a specified period of time, wherein, at first, current internal data in the internal program is compared to data scanned in a preceding scanning operation in the device memory 18 (Step S100), then if the data has been changed (Step S101 affirmative), data for PLC such as a network number, a unit number, and a device name or the like, and the changed data are set in one frame and transmitted to the network data server apparatus 1 (Step S102). As for the sequence for transmitting the changed data from the PLC to the network data server apparatus 1, if data changed is transmitted respectively, communication lines become heavy, so that a plurality of changed data can be collected into a group having a size so that the data can be transmitted through the network and transmitted.

Then a notice on change of data from the network data server apparatus 1 is waited (step S103), and when the data is received (Step S104), the data is written at the specified memory address of the device memory 18 for PLC (Step S105).

FIG. 4 and FIG. 5 show the operation flow in the network data server apparatus. This operation flow is repeatedly executed once for each specified period of time, wherein, at first, the apparatus enters a state of waiting for receiving PLC data as well as changed data from the PLC (Step S200), then if the changed data is received (Step S201 affirmative), the PLC data is analyzed and the received data is written at the specified memory address of the memory 7 for PLC (Step S202).

Then the apparatus waits for a data read request from the FA controller 2 (Step S203), and when the data read request is received (Step S204 affirmative), reads out the object data for the read request from the memory 7 for PLC and transmits the data to the FA controller 2 (Step S205).

Then the apparatus waits for a data write request from the FA controller 2 (Step S206), and when the write data is received (Step S207 affirmative), the received data is compared to the corresponding internal data in the memory 7 for PLC (Step S208). In this comparison, if there is any change in the data (Step S209 affirmative), new data (received data) from the FA controller is written at the specified memory address of the memory 7 for PLC (Step S210), and also the data is transmitted to the PLC together with PLC data (Step S211).

Then in data write into the memory 7 for PLC, determination is made as to whether the memory address at which data is written is the memory address from which data is copied described in the copy data list section 10, or not (Step S212), and if it is determined that the memory address at which data is written is the memory address from which data is copied described in the copy data list section 10 (Step S212 affirmative), the data is written at the memory address, at which data is to be copied, described in the copy data list section 10, thus data copying being executed (Step S213).

It should be noted that, even when data for the memory 7 for PLC is changed as a result of data copying, the data is transmitted to the PLC together with PLC data.

Data copying described above is accurately executed with a quick response and without depending on the FA controller 2. With this feature, a work load to the FA controller is reduced and a production line or the like can be kept operating as usual even if the system in the FA controller 2 is changed. In this case, the FA controller 2 executes only processing for changing parameters, and is not required to store address data for PLCs $3_1$ to $3_n$, so that memory resources in the FA controller 2 can be saved. In addition, the program for data copying between PLCs is not required to be incorporated into PLC.

Data for each of PLCs $3_1$ to $3_n$ is controlled monolithically in the network data server apparatus 1, so that, when the FA controller outputs a read/write request to a plurality units of PLCs, it is not necessary for the FA controller to output the read/write request to each of PLCs, and for this reason processing such as programming becomes easier.

Figure 7:
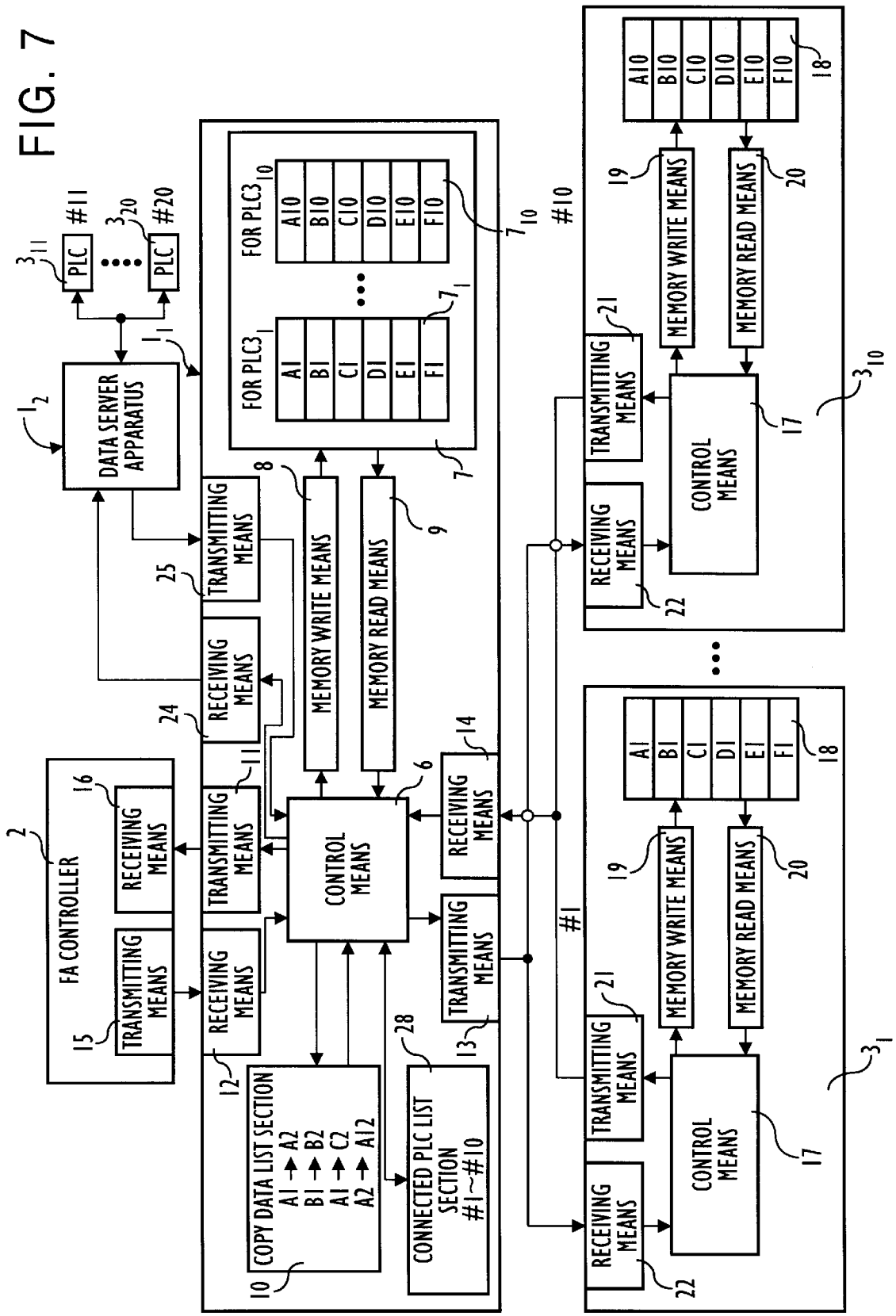
FIG. 7 is a block diagram showing Embodiment 2 of the network data server apparatus in the side with the FA controller according to the present invention connected thereto.
Figure 8:
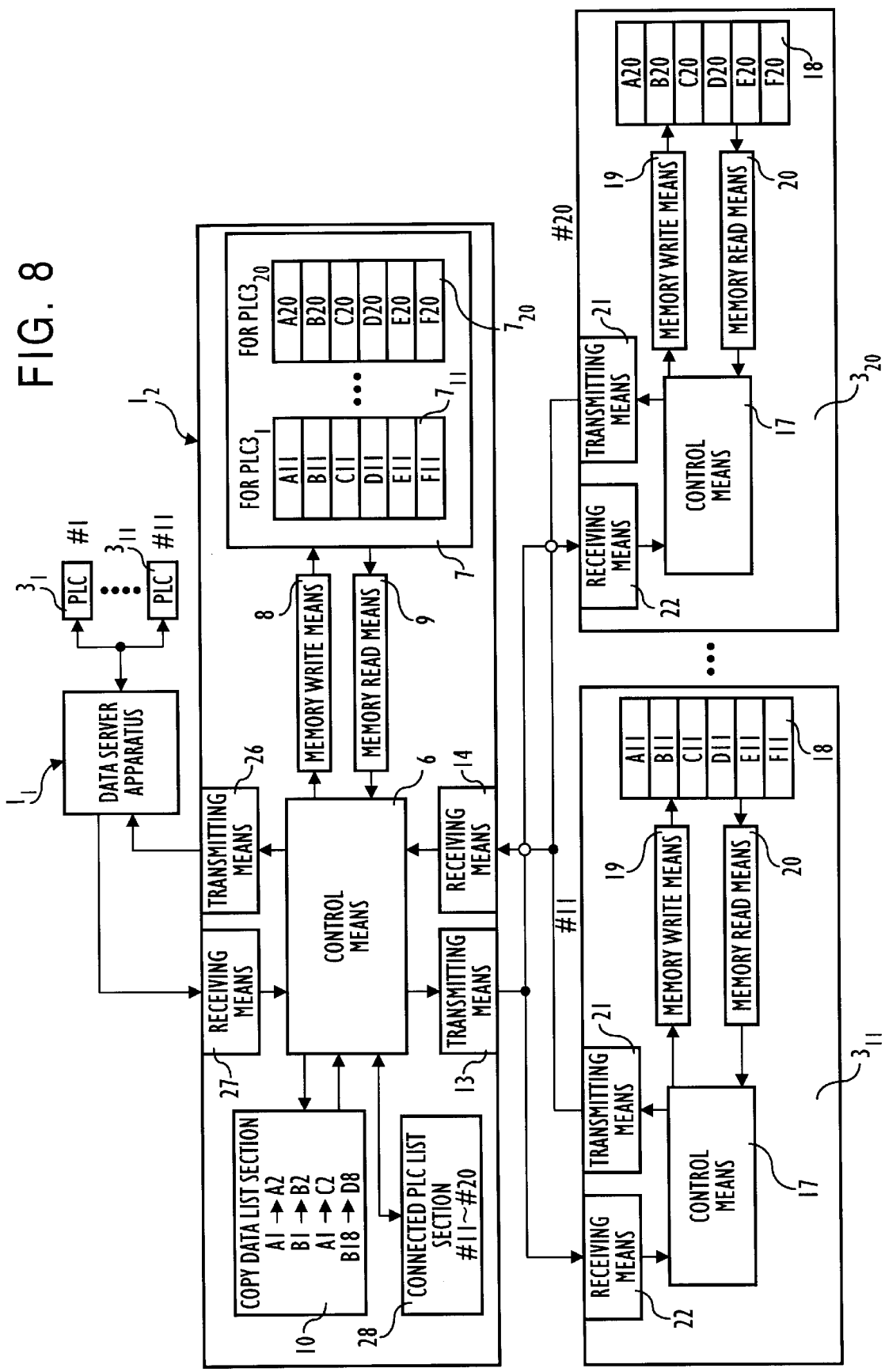
FIG. 8 is a block diagram showing Embodiment 2 of the network data server apparatus in the side with the FA controller according to the present invention not connected thereto.

FIG. 6 to FIG. 8 show Embodiment 2 of the PLC system including the network data server apparatus according to the present invention. In Embodiment 2, as shown in FIG. 6, the network data server apparatus 1 comprising two units of the network data server apparatuses $1_1$ and $1_2$ is used.

Connected to the network data server apparatus $1_1$ is a unit of the FA controller 2 through the communication path 4 in a manner enabling bidirectional communications, and also connected thereto are the PLCs $3_1$ to $3_{10}$ in a manner enabling bidirectional communications through the communication path $5_1$, while connected to the network data server apparatus $1_2$ are the PLCs $3_{11}$ to $3_{20}$ in a manner enabling bidirectional communications through the communication path 52 with the network data server apparatuses $1_1$ and $1_2$ connected to each other through the communication path 23 in a manner enabling bidirectional communications.

The memory 7 for PLC in the network data server apparatus 11 has the memory regions $7_1$ to $7_{10}$ for the PLCs $3_1$ to $3_{10}$, which are PLCs connected to the network data server, while the memory 7 for PLC in the network data server apparatus $1_2$ has the memory regions $7_{11}$ to $7_{20}$ for the PLCs $3_{11}$ to $3_{20}$ also connected to the network data server.

The network data server apparatus $1_1$, as shown in FIG. 7, has such a configuration that the transmitting means 24 as well as the receiving means 25 for communication with the network data server apparatus 12 are added to the network data server apparatus 1 in Embodiment 1, while the network data server apparatus $1_2$, as shown in FIG. 8, has such a configuration that the transmitting means 11 as well as the receiving means 12 for communication with the FA controller 2 are omitted from the network data server apparatus 1 in Embodiment 1, and in place thereof, the transmitting means 26 as well as the receiving means 27 for communication with the network data server apparatus $1_1$ are added thereto.

The copy data list section 10 includes a portion describing therein the memory addresses from which data is copied and those at which data is copied, for data copying between different network data server apparatuses such as, for instance, $A_2$ to $A_{12}$, or $B_{18}$ to $D_8$.

With this feature, any of the control means 6 in the network data server apparatus $1_1$ and $1_2$ provides a control to execute data copying to and from each other between the network data server apparatuses $1_1$ and $1_2$ through the transmitting means 24 and 26 as well as the receiving means 25 and 27 according to the memory addresses from which data is copied and those at which data is copied, each described in the copy data list section 10.

The network data server apparatuses $1_1$ and $1_2$ have a connected PLC list section 28 respectively. The connected PLCs list section 28 indicates a list of network numbers of PLCs connected to the network data server apparatus, and the connected PLC list section 28 in the network data server apparatus $1_1$ indicates the fact that the PLCs each having network numbers #1 to #10 are connected to the network data server apparatus $1_1$, while the connected PLC list section 28 in the network data server apparatus $1_2$ indicates that the PLCs each having network numbers #11 to #20 are connected to the network data server apparatuses $1_2$.

The control means 6 in network data server apparatus $1_1$ determines, when a read/write request for the FA controller is received, whether the data read/write request is for the PLC connected to the network data server apparatus or not, namely it is for its own unit or not by referring to the list contents in the connected PLC list section 28, and if the data read/write is for its own unit, the control means 6 therein executes the processing for the request by itself, while if the data read/write request is not for its own unit, provides a control to transmit the data read/write request to other network data server apparatus $1_2$ with the transmitting means 24.

Next, a description is made for operations in Embodiment 2 with reference to FIG. 9 to FIG. 12.

Figure 9:
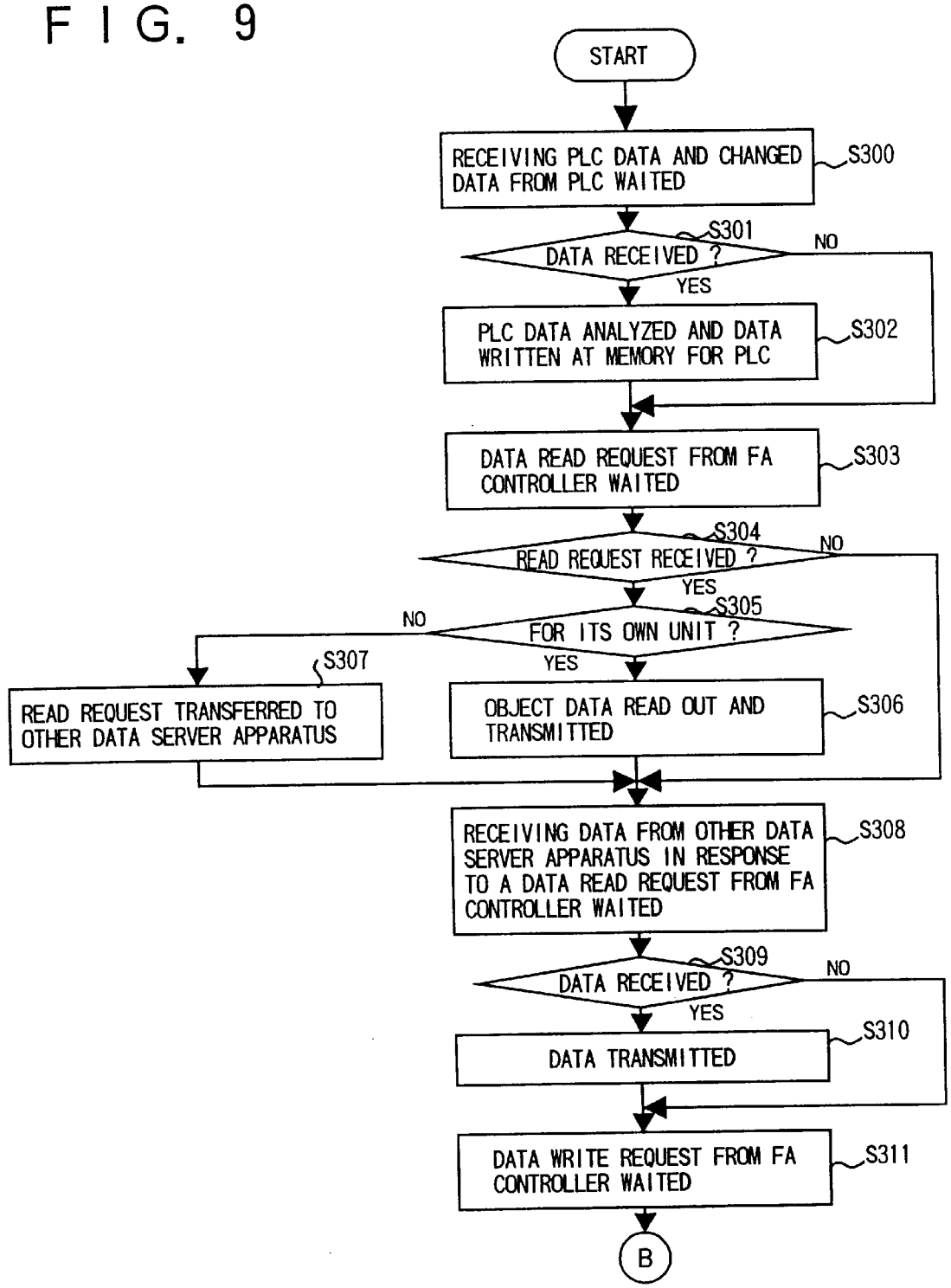
FIG. 9 is a flow chart showing a first half portion of an operation flow in Embodiment 2 of the network data server apparatus in the side with the FA controller according to the present invention connected thereto.
Figure 10:
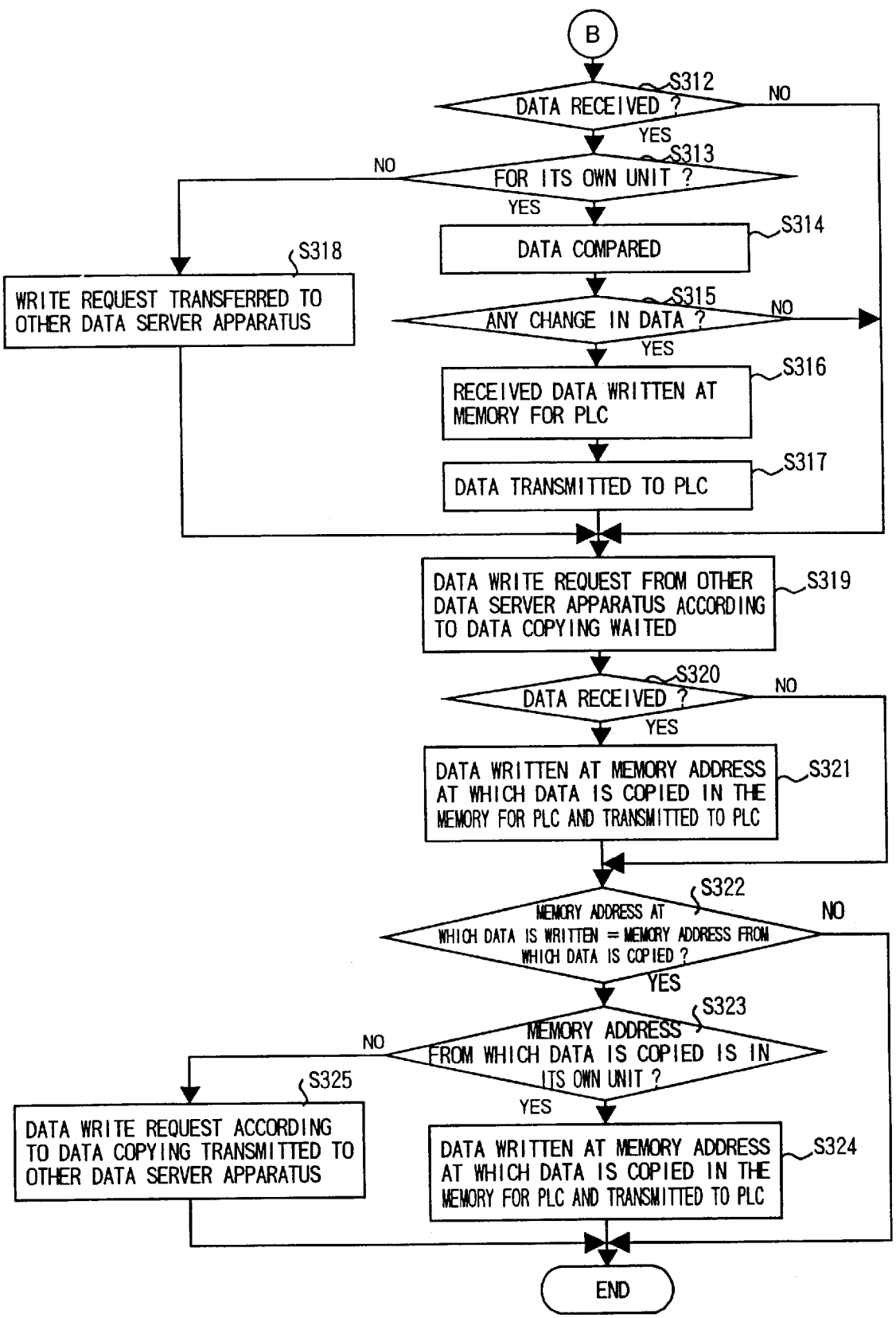
FIG. 10 is a flow chart showing a latter half portion of an operation flow in Embodiment 2 of the network data server apparatus in the side with the FA controller according to the present invention connected thereto.

FIG. 9 and FIG. 10 show an operation flow in the network data server apparatus 11 respectively. This operation flow is repeatedly executed once for each specified period of time, wherein the apparatus 11 at first enters a state of waiting for receiving PLC data and changed data from the PLC connected to its own unit (the network data server apparatus) (Step S300), then when the changed data is received (Step S301 affirmative), the network data server apparatus $1_1$ analyzes the PLC data from PLCs connected to the network data server and writes the received data at the specified memory address of the memory 7 for PLC in its own unit (Step S302).

Then the apparatus $1_1$ waits for a data read request from the FA controller 2 (Step S303), and when a data read request is received (Step S304 affirmative), the apparatus $1_1$ determines whether the data read request is for its own unit or not by referring to the list contents in the connected PLC list section 28 (Step S305).

If the data read request is for its own unit (Step S305 affirmative), the object data for the read request is read out from the memory 7 for PLC in its own unit, and the data is transmitted to the FA controller 2 (Step S306).

In contrast, if the data read request is not for its own unit (Step S305 negative), the data read request received from the FA controller 2 with the network data server apparatus $1_1$ is transferred to other network data server apparatus $1_2$ (Step S307).

Then the apparatus $1_1$ enters a state of waiting for receiving data from other network data server apparatus $1_2$ (Step S308) in response to a data read request from the FA controller 2, and when the data is received (Step S309 affirmative), the apparatus $1_1$ transmits the data to the FA controller 2 (step S310).

Then the apparatus $1_1$ waits for a data write request from the FA controller 2 (Step S311), and when the write data is received (Step S312 affirmative), the apparatus determines whether the write data is for its own unit or not by referring to the list contents in the connected PLC list section 28 (Step S313).

If the data is for its own unit (Step S313 affirmative), the received data is compared to the corresponding internal data in the memory 7 for PLC in its own unit (Step S314). In this comparison, if there is any change in data (Step S315 affirmative), the new data (received data) from the FA controller 2 is written at the specified memory address of the memory 7 for PLC (Step S316), and the data is transmitted to the PLC together with PLC data (Step S317).

In contrast, if the data write request from the FA controller 2 is not for its own unit (Step S313 negative), the data write request received from the FA controller 2 with the network data server apparatus $1_1$ is transferred to other network data server apparatus $1_2$ (Step S318).

Then the apparatus $1_1$ waits for a data write request from other network data server apparatus $1_2$ due to a result of data copying (Step S319), and when the write data is received (Step S320 affirmative), the data is written at the memory address at which data is to be copied in the memory for PLC in its own unit and also the data is transmitted to the PLC connected to its own unit (Step S321).

Then in data write into the memory 7 for PLC, the apparatus 11 determines whether the memory address at which data is written is the memory address from which data is copied described in the copy data list section 10 or not (step S322), and if the memory address at which data is written is the memory address from which data is copied described in the copy data list section 10, determination is made as to whether the memory address from which data is copied is in its own unit or not by referring to the list contents in the connected PLC list section 28 (Step S323).

If the memory address from which data is copied is in its own unit (Step S323 affirmative), the data is written at the memory address at which data is to be copied in the memory for PLC in its own unit and also the data is transmitted to the PLC connected to its own unit (Step S324).

In contrast, if the memory address from which data is copied is not in its own unit (Step S323 negative), the data write request according to data copying is transmitted to other network data server apparatus $1_2$ (Step S325).

Figure 11:
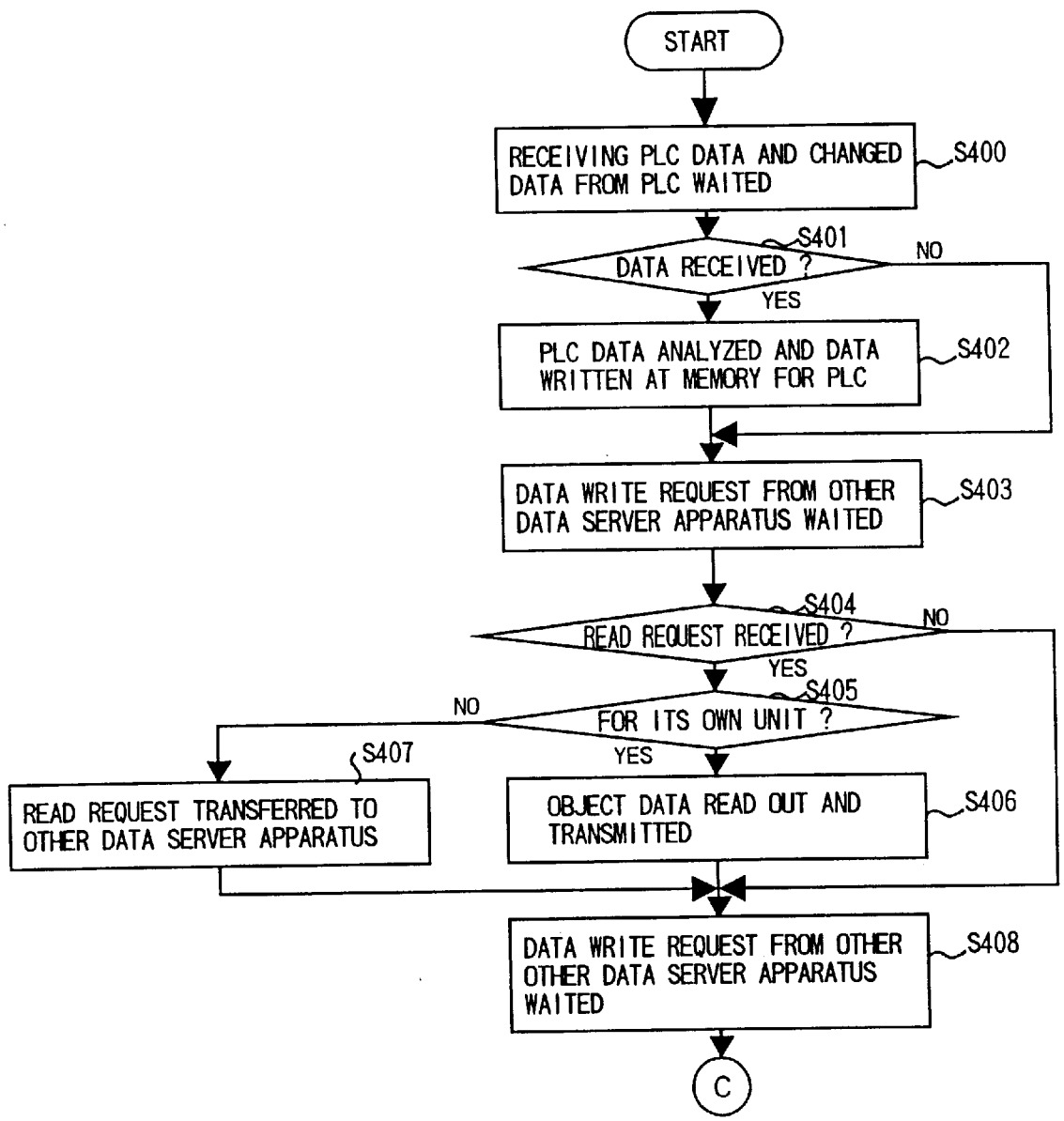
FIG. 11 is a flow chart showing the first half portion of an operation flow in Embodiment 2 of the network data server apparatus in the side with the FA controller according to the present invention not connected thereto.
Figure 12:
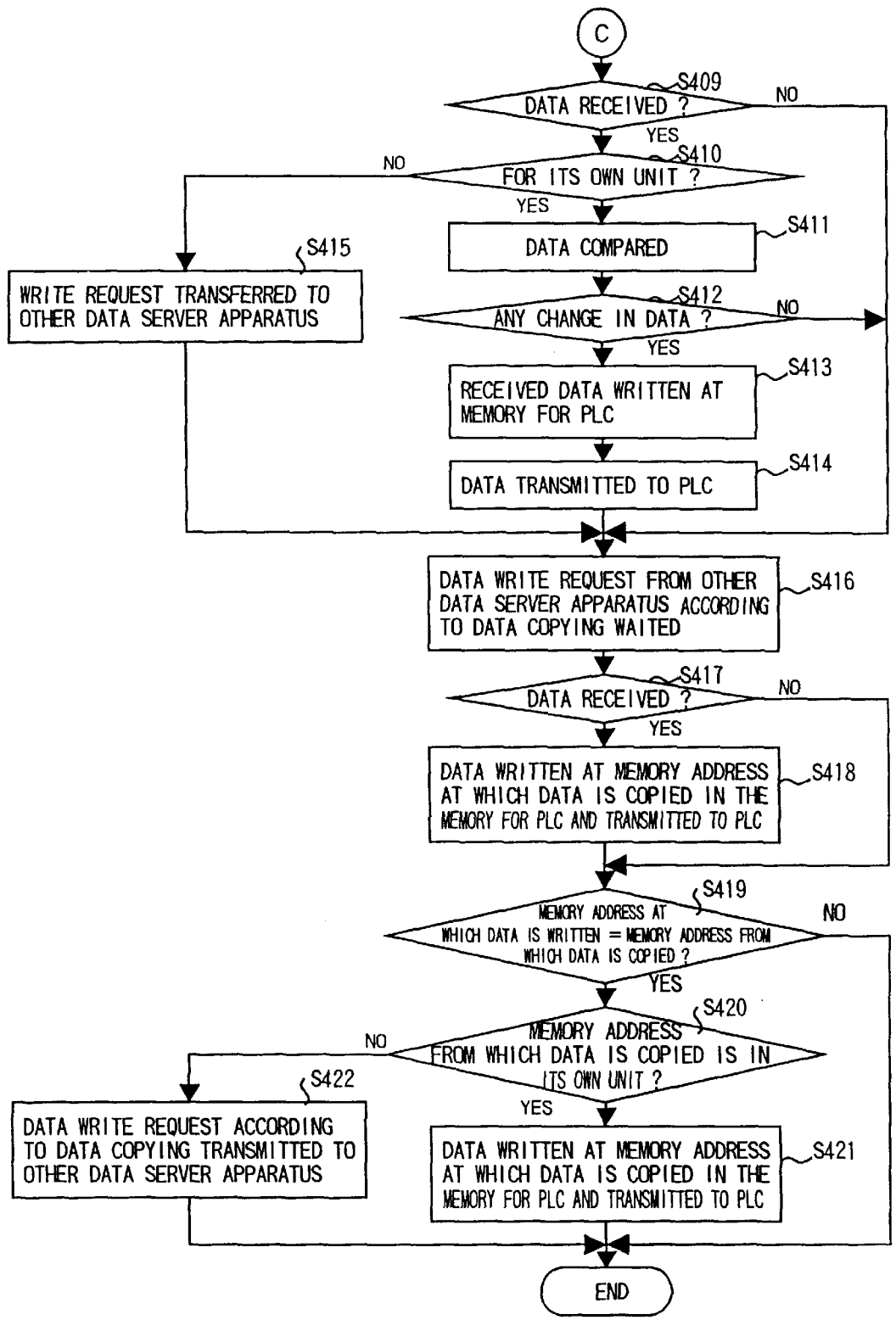
FIG. 12 is a flow chart showing the latter half portion of an operation flow in Embodiment 2 of the network data server apparatus in the side with the FA controller according to the present invention not connected thereto.

FIG. 11 and FIG. 12 show an operation flow in the network data server apparatus $1_2$. This operation flow is also repeatedly executed one for each specified period of time, wherein, at first, the apparatus $1_2$ enters a state of waiting for receiving PLC data and changed data from the PLC connected to its own unit (Step S400), and when the changed data is received (Step S401 affirmative), the network data server apparatus $1_2$ analyzes the PLC data and writes the received data at the specified address in the memory 7 for PLC in its own unit (Step S402).

Then the apparatus $1_2$ waits for a data read request from the FA controller 2 transferred from the network data server apparatus $1_1$ (Step S403), and when the data read request is received (Step S404 affirmative), the apparatus determines whether the request is for its own unit or not by referring to the list contents in the connected PLC list section 28 (Step S405).

If the request is for its own unit (Step S405 affirmative), the object data for the read request is read out from the memory 7 for PLC in its own unit, and the data is transmitted to the network data server apparatus $1_1$ (Step S406). In contrast, if the data read request from the FA controller 2 is not for its own unit (Step S405 negative), the data read request from the FA controller 2 transferred from the network data server apparatus $1_1$ is transferred further to other network data server apparatus (Step S407).

It should be noted that Steps 405 and 407 are necessary as long as other network data server apparatus is present in addition to the network data server apparatuses $1_1$ and $1_2$, and in the embodiment shown in FIG. 7 and FIG. 8, these steps are not necessary.

Then the apparatus $1_2$ waits for a data write request from the FA controller 2 transferred from the network data server apparatus $1_1$ (Step S408), and when the write data is received (Step S409 affirmative), the apparatus determines whether the data is for its own unit or not by referring to the list contents in the connected PLC list section 28 (Step S410).

If the data is for its own unit (Step S410 affirmative), the received data is compared to the corresponding internal data in the memory 7 for PLC in its own unit (Step S411). In this comparison, if there is any change in data (Step S412 affirmative), new data (received data) from the FA controller 2 is written at the specified memory address in the memory 7 for PLC (Step S413), and also the data is transmitted to the PLC together with PLC data (Step S414).

In contrast, if the data write request from the FA controller 2 is not for it own unit (Step S410 negative), the data write request from the FA controller 2 transferred from the network data server apparatus $1_1$ is transferred further to other network data server apparatus (Step S415).

It should be noted that Steps 410 and 415 are also necessary as long as other network data server apparatus is present in addition to the network data server apparatuses $1_1$ and $1_2$, and in the embodiment shown in FIG. 7 and FIG. 8, these steps are not necessary.

Then the apparatus $1_2$ waits for a data write request from other network data server apparatus $1_1$ due to a result of data copying (Step S416), and when the write data is received (Step S417 affirmative), the apparatus writes the data at the memory address at which the data is to be copied in the memory for PLC in its own unit, and also transmits the data to the PLC connected to its own unit (Step S418).

Then in data write into the memory 7 for PLC, determination is made as to whether the memory address at which data is written is the memory address from which data is copied described in the copy data list section 10 or not (Step S419), and if the memory address at which data is written is the memory address from which data is copied described in the copy data list section 10, determination is made as to whether the memory address from which data is copied is in its own unit or not by referring to the list contents in the connected PLC list section 28 (Step S420).

If the memory address from which data is copied is in its own unit (Step S420 affirmative), the data is written into the memory address at which data is to be copied in the memory for PLC in its own unit, and also the data is transmitted to the PLC connected to its own unit (Step S421).

In contrast, if the memory address from which data is copied is not in its own unit (Step S420 negative), the data write request according to data copying is transmitted to other network data server apparatus $1_1$ (Step S422).

In this Embodiment 2, data copying according to memory addresses from which data is copied and those at which data is copied, each described in the copy data list section, is executed extendedly in a range between the between the network data server apparatuses, and the data copying between the network data server apparatuses is accurately executed with a quick response and like in Embodiment 1 without depending on any task of the FA controller.

Also the network data server apparatus $1_1$ determines whether the data read/write request from the FA controller 2 is for its own unit or not by referring to the list contents in the connected PLC list section 28, and if it is not for its own unit, the data read/write request is transferred further to other network data server apparatus $1_2$, so that the FA controller 2 is not necessary to store communication address data for network data server apparatuses, and executes transparent data transmission with each of network data server apparatuses without being aware of the fact to which network data server apparatus the PLC is connected.

Figure 13:
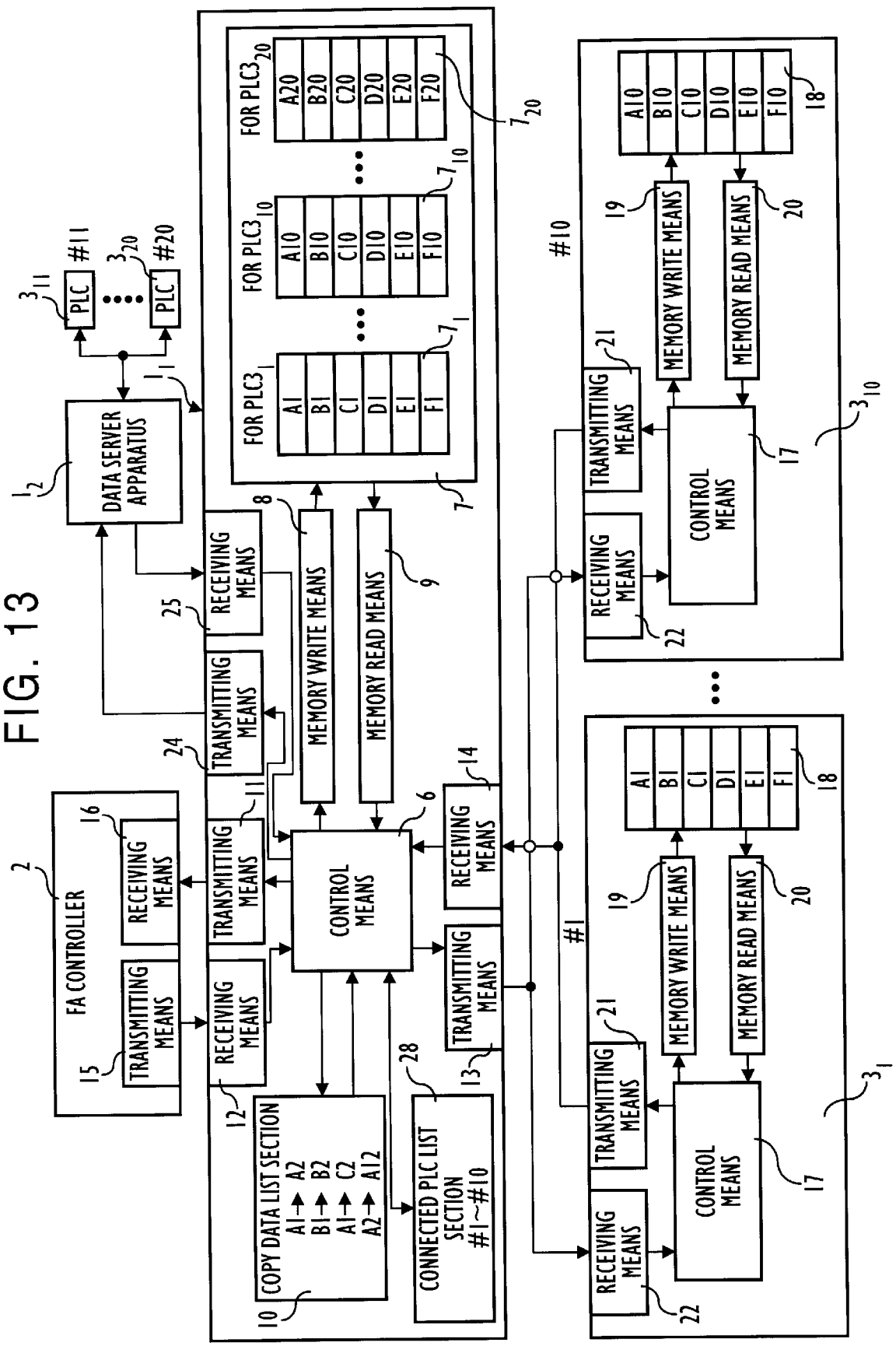
FIG. 13 is a block diagram showing Embodiment 3 of the network data server apparatus in the side with the FA controller according to the present invention connected thereto.

FIG. 13 shows Embodiment 3 of the PLC system including the network data server apparatus according to the present invention. In this Embodiment 3, the memory 7 for PLC in the network data server apparatus $1_1$ has the memory regions $7_1$ to $7_{10}$ for storing data for PLCs $3_1$ to $3_{10}$ connected thereto, and in addition, has the memory regions $7_{11}$ to $7_{20}$ for storing PLCs $3_{11}$ to $3_{20}$ connected to the network data server apparatus $1_2$.

The network data server apparatus $1_2$ in Embodiment 3 may be the same configuration as that in Embodiment 2 shown in FIG. 8.

With this feature, the memory for PLC for PLCs $3_{11}$ to $3_{20}$ is present in both the network data server apparatuses $1_1$ and $1_2$ duplicatedly.

In Embodiment 3, if the data for the memory 7 for PLC in its own unit (refer to FIG. 8) is rewritten, the control means 6 in the network data server apparatus $1_2$ transmits the data to the network data server apparatus $1_1$ in order to make data duplicated. In contrast, if the control means 6 in the network data server apparatus $1_1$ receives the data for making data duplicated from the network data server apparatus $1_2$, the control means 6 writes the data into the specified memory address of the memory 7 for PLC in its own unit.

Next, a description is made for operations in Embodiment 3 with reference to FIG. 14 to FIG. 17.

Figure 14:
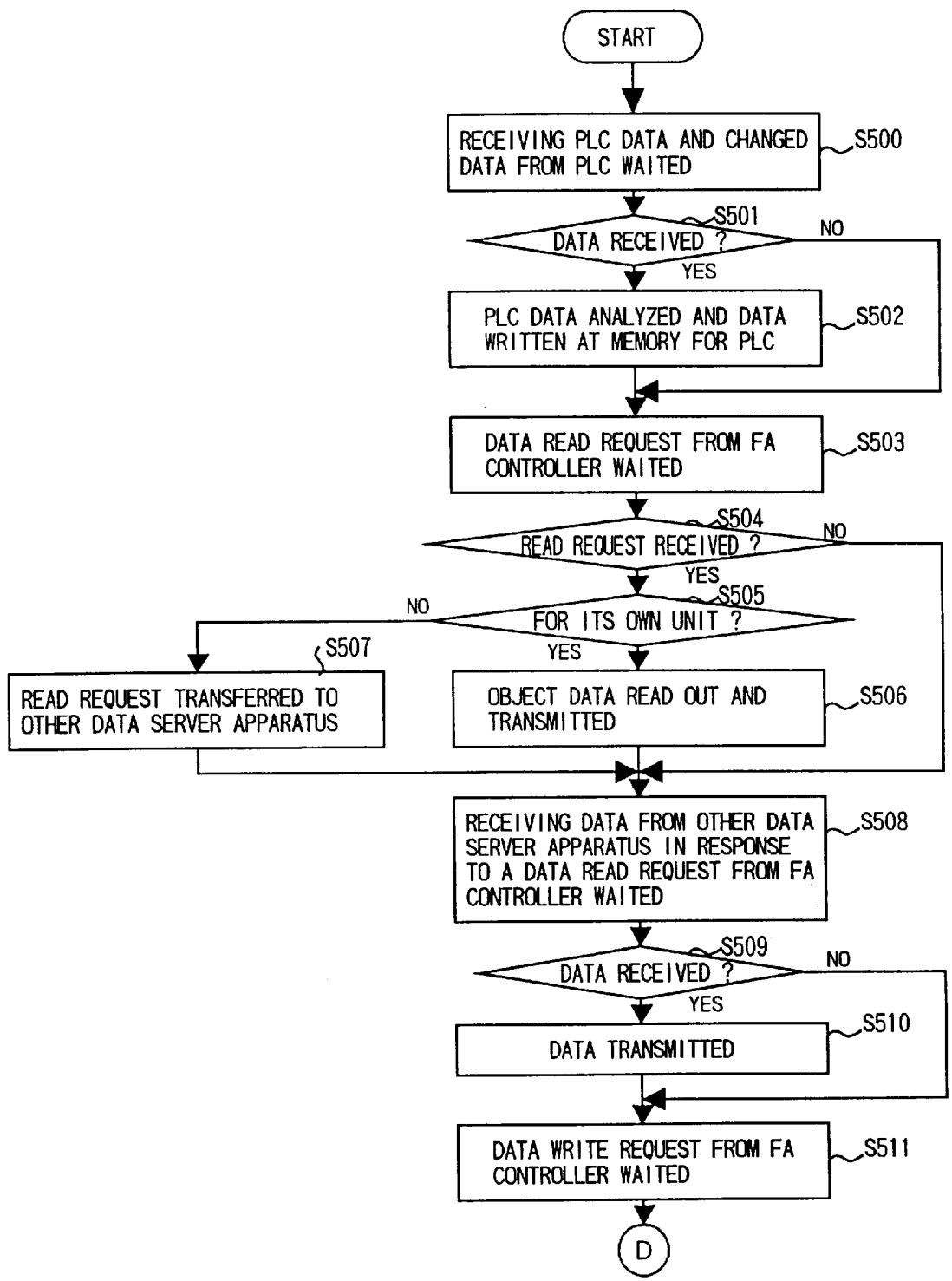
FIG. 14 is a flow chart showing the first half portion of an operation flow in Embodiment 3 of the network data server apparatus in the side with the FA controller according to the present invention connected thereto.
Figure 15:
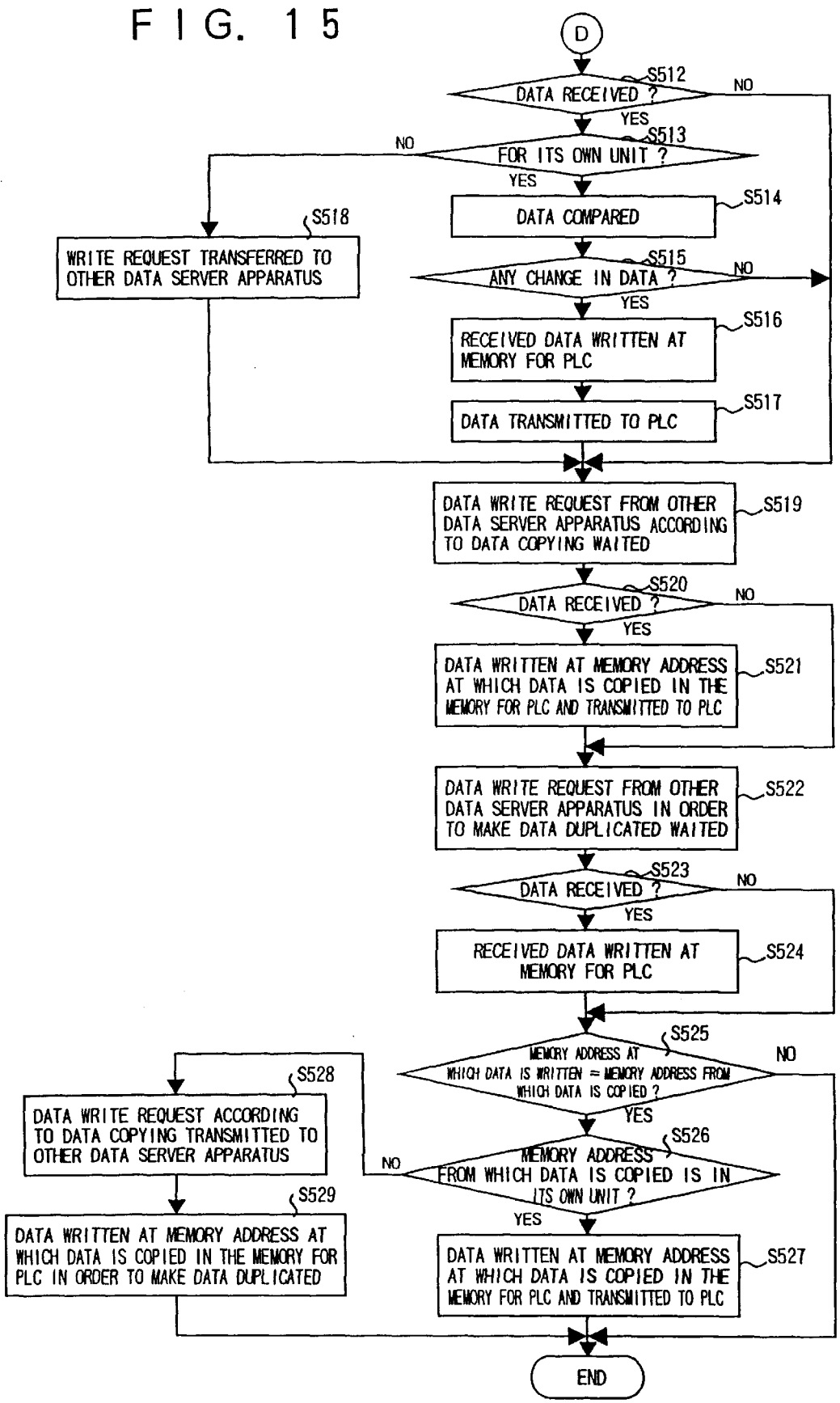
FIG. 15 is a flow chart showing a latter half portion of the operation flow in Embodiment 3 of the network data server apparatus in the side with the FA controller according to the present invention connected thereto.

FIG. 14 a FIG. 15 show an operation flow in the network data server apparatus $1_1$ respectively. This operation flow is repeatedly executed once for each specified period of time, wherein, at first, the apparatus $1_1$ enters a state of waiting for receiving PLC data and changed data from the PLC connected to its own unit (own network data server apparatus) (Step S500), and when the changed data is received (Step S501 affirmative), the apparatus analyzes the PLC data and writes the received data at the specified memory address in the memory 7 for PLC in its own unit (Step S502).

Then the apparatus $1_1$ waits for a data read request from the FA controller 2 (Step S503), and when a data read request is received (Step S504 affirmative), the apparatus determines whether the request is for its own unit or not by referring to the list contents in the connected PLC list section 28 (Step S505).

If the request is for its own unit (Step S505 affirmative), the object data for the read request is read out from the memory 7 for PLC in its own unit, and this data is transmitted to the FA controller 2 (Step S506).

In contrast, if the data read request from the FA controller 2 is not for its own unit (Step S505 negative), the data read request received from the FA controller 2 with the network data server apparatus $1_1$ is transferred to other network data server apparatus $1_2$ (Step S507).

Then the apparatus $1_1$ enters a state of waiting for receiving data responding to a data read request from the FA controller 2 from other network data server apparatus $1_2$ (Step S508), and when the data is received (Step S509 affirmative), transmits the data to the FA controller 2 (Step S510).

Then the apparatus $1_1$ waits for a data write request from the FA controller 2 (Step S511), and when the write data is received (Step S512 affirmative), the apparatus $1_1$ determines whether the data is for its own unit or not by referring to list contents of the connected PLC list section 28 (Step S513).

If the data is for its own unit (Step S513 affirmative), the received data is compared to corresponding internal data thereto of the memory for PLC in its own unit (Step S514). In this comparison, if there is any change in data (Step S515 affirmative), new data (received data) from the FA controller 2 is written at a specified memory address of the memory 7 for PLC (Step S516), and the data is transmitted to the PLC together with PLC data (Step S517).

In contrast, if the data write request from the FA controller 2 is not for its own unit (Step S513 negative), the data write request received from the FA controller 2 with the network data server apparatus $1_1$ is transferred to other network data server apparatus $1_2$ (Step S518).

Then the apparatus $1_1$ waits for a data write request due to a result of data copying from other network data server apparatus $1_2$ (Step S519), and when the write data is received (Step S520 affirmative), the data is written at the memory address at which data is to be copied in the memory for PLC in its own unit, and also the data is transmitted to the PLC connected to its own unit (Step S521).

Then the apparatus $1_1$ waits for a data write request from other network data server apparatus 12 in order to make data duplicated (Step S522), and when the write data is received (Step S523 affirmative), the data is written at the specified memory address of the memory 7 for PLC in its own unit (Step S524).

Then in data write into the memory 7 for PLC, determination is made as to whether the memory address at which data is written is the memory address from which data is copied described in the copy data list section 10 or not (Step S525), and if the memory address at which data is written is the memory address from which data is copied described in the copy data list section 10, whether the memory address from which data is copied is in its own unit or not is determined by referring to list contents of the connected PLC list section 28 (Step S526).

If the memory address from which data is copied is in its own unit (Step S526 affirmative), data is written at the memory address at which data is to be copied in the memory 7 for PLC in its own unit, and also the data is transmitted to the PLC connected to its own unit (Step S527).

In contrast, if the memory address from which data is copied is not in its own unit (Step S526 negative), the data write request according to data copying is transmitted to other network data server apparatus $1_2$ (Step S528), and the data is written at the memory address at which data is to be copied in the memory 7 for PLC, in order to make data duplicated (Step S529).

Figure 17:
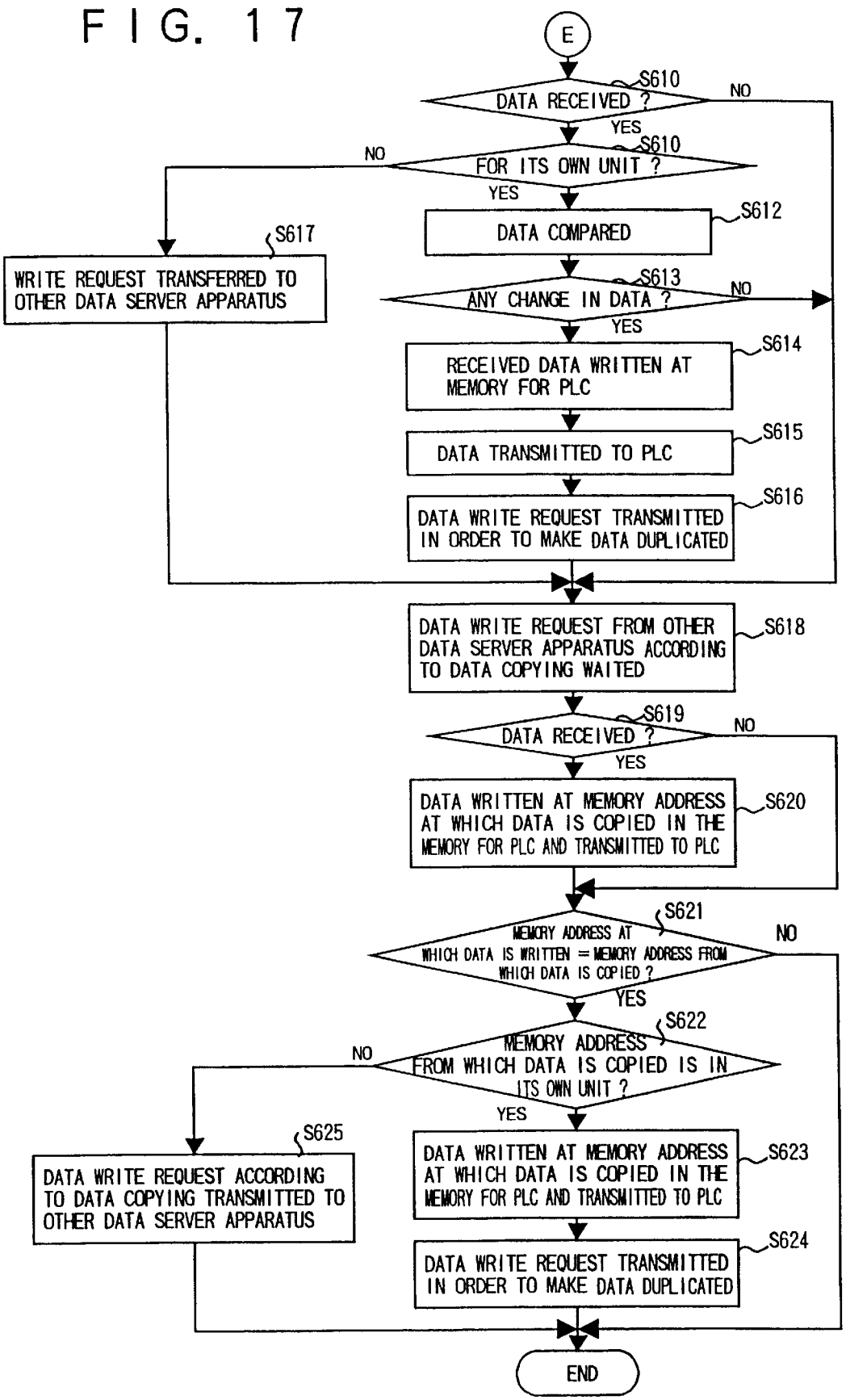
FIG. 17 is a flow chart showing the latter half portion of an operation flow in Embodiment 3 of the network data server apparatus in the side with the FA the FA controller according to the present invention not connected thereto.

FIG. 16 and FIG. 17 show an operation flow in the network data server apparatus $1_2$. This operation flow is repeatedly executed once for each specified period of time, wherein, at first, the apparatus $1_2$ enters a state of waiting for receiving PLC data and changed data from the PLC connected to its own unit (Step S600), and when changed data is received (Step S601 affirmative), the apparatus $1_2$ analyzes the PLC data and writes the received data at the specified memory address of the memory 7 for PLC in its own unit (Step S602). Also the apparatus $1_2$ transmits the data write request for transmitting the received data to the network data server apparatus $1_1$ in order to make data duplicated to the network data server apparatus $1_1$ (Step S603).

Then the apparatus $1_2$ waits for a data read request from the FA collector 2 transferred from the network data server apparatus $1_1$ (Step S604), and when a data read request is received (Step S605 affirmative), determination is made as to whether the request is for its own unit or not by referring to list contents of the connected PLC list section 28 (Step S606).

If the request is for its own unit (Step S606 affirmative), the object data for the read request is read out from the memory 7 for PLC in its own unit, and the data is transmitted to the network data server apparatus $1_1$ (Step S607).

In contrast, if the data read request from the FA controller is not for its own unit (Step S606 negative), the data read request from the FA controller transferred from the network data server apparatus $1_1$ is transferred further to other network data server apparatus (Step S608).

Then the apparatus waits for a data write request from the FA controller 2 transferred from the network data server apparatus $1_1$ (Step S609), and when write data is received (Step S610 affirmative), determination is made as to whether the data is for its own unit or not by referring to list contents of the connected PLC list section 28 (Step S611).

If the data is for its own unit (Step S611 affirmative), the received data is compared to corresponding internal data thereto of the memory 7 for PLC in its own unit (Step S612). In this comparison, if there is any change in data (Step S613 affirmative), new data (received data) from the FA controller 2 is written at the specified memory address of the memory 7 for PLC (Step S614), and the data is transmitted to the PLC together with PLC data (Step S615). Also the data write request for transmitting the received data to the network data server apparatus $1_1$ in order to make data duplicated is transmitted to the network data server apparatus $1_1$ (Step S616).

In contrast, if the data write request from the FA controller 2 is not for its own unit (Step S611 negative), the data write request from the FA controller 2 transferred from the network data server apparatus $1_1$ is transferred further to other network data server apparatus (Step S617).

Then the apparatus $1_2$ waits for a data write request from other network data server apparatus $1_1$ due to a result of data copying (Step S618), and when the write data is received (Step S619 affirmative), data is written at the memory address at which data is to be copied in the memory for PLC in its own unit, and also the data is transmitted to the PLC connected to its own unit (Step S620).

Then in data write into the memory 7 for PLC, determination is made as to whether the memory address at which data is written is the memory address from which data is copied described in the copy data list section 10 (Step S621), and if the memory address at which data is written is the memory address from which data is copied described in the copy data list section 10, determination is made as to whether the memory address from which data is copied is in its own unit or not by referring to list contents of the connected PLC list section 28 (Step S622).

If the memory address from which data is copied is in its own unit (Step S622 affirmative), the data is written at the memory address at which data is to be copied in the memory for PLC in its own unit, and also the data is transmitted to the PLC connected to its own unit (Step S623). The data write request for transmitting the received data to the network data server apparatus $1_1$ in order to make data duplicated is transmitted to the network data server apparatus $1_1$ (Step S624).

In contrast, if the memory address from which data is copied is not in its own unit (Step S622 negative), the data write request according to data copying is transmitted to other network data server apparatus $1_1$ (Step S625).

With this feature, in this embodiment, data for PLCs $3_{11}$ to $3_{20}$ connected to the network data server apparatus $1_2$ is made duplicated with the memory 7 for PLC in the network data server apparatus $1_1$ and the memory 7 for PLC in the network data server apparatus $1_2$, and for this reason even if the data is destroyed in one side, a data in another side can be used as back-up data.

For this reason, for instance, even if some trouble occurs in the memory 7 for PLC of the network data server apparatus $1_2$, which causes data stored in the memory 7 for PLC to be destroyed, write/read of the data for PLCs $3_{11}$ to $3_{20}$ stored in the memory 7 for PLC of the network data server apparatus $1_1$ can be executed.

The fact that the memory 7 for PLC is in a disabled state is detected by means of communications between the network data server apparatuses to differentiate a memory which can not output data from others.

In addition, when a write/read request is transmitted from the FA controller 2, and if there is no response thereto in the memory, determination is made as to whether the object memory 7 for PLC to be accessed has been disabled, then the data may be written in or read out from the memory 7 for PLC of other network data server apparatus in which data has been made duplicated.

It should be noted that, in the embodiment described above, although only data for PLCs $3_{11}$ to $3_{20}$ are duplicated, data for PLCs $3_1$ to $3_{10}$ can also be made duplicated by holding data region for storing data for PLCs $3_1$ to $3_{10}$ in the memory 7 for PLC of the network data server apparatus $1_2$.

Figure 18:
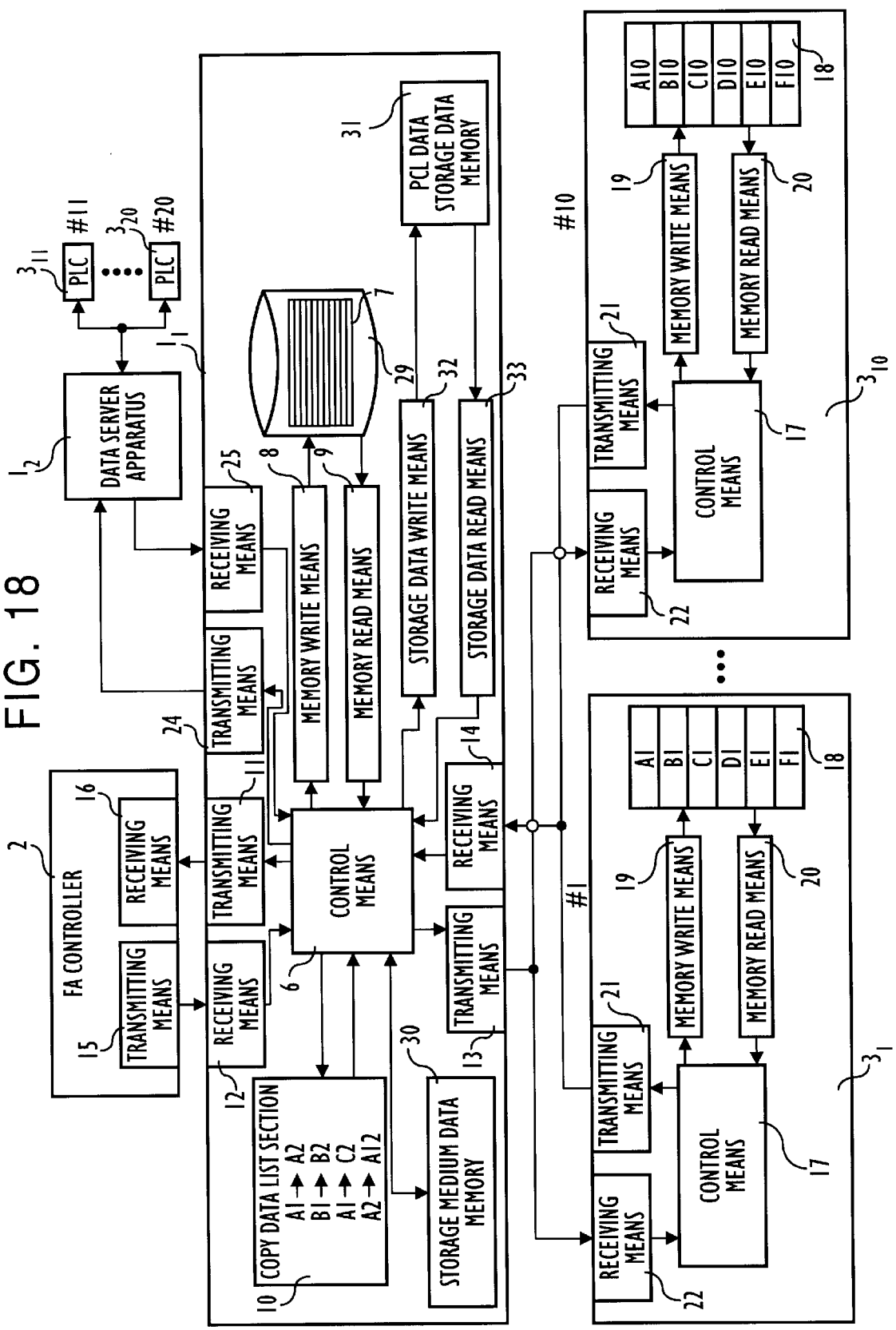
FIG. 18 is a block diagram showing Embodiment 4 of the network data server apparatus in the side with the FA controller according to the present invention connected thereto.
Figure 19:
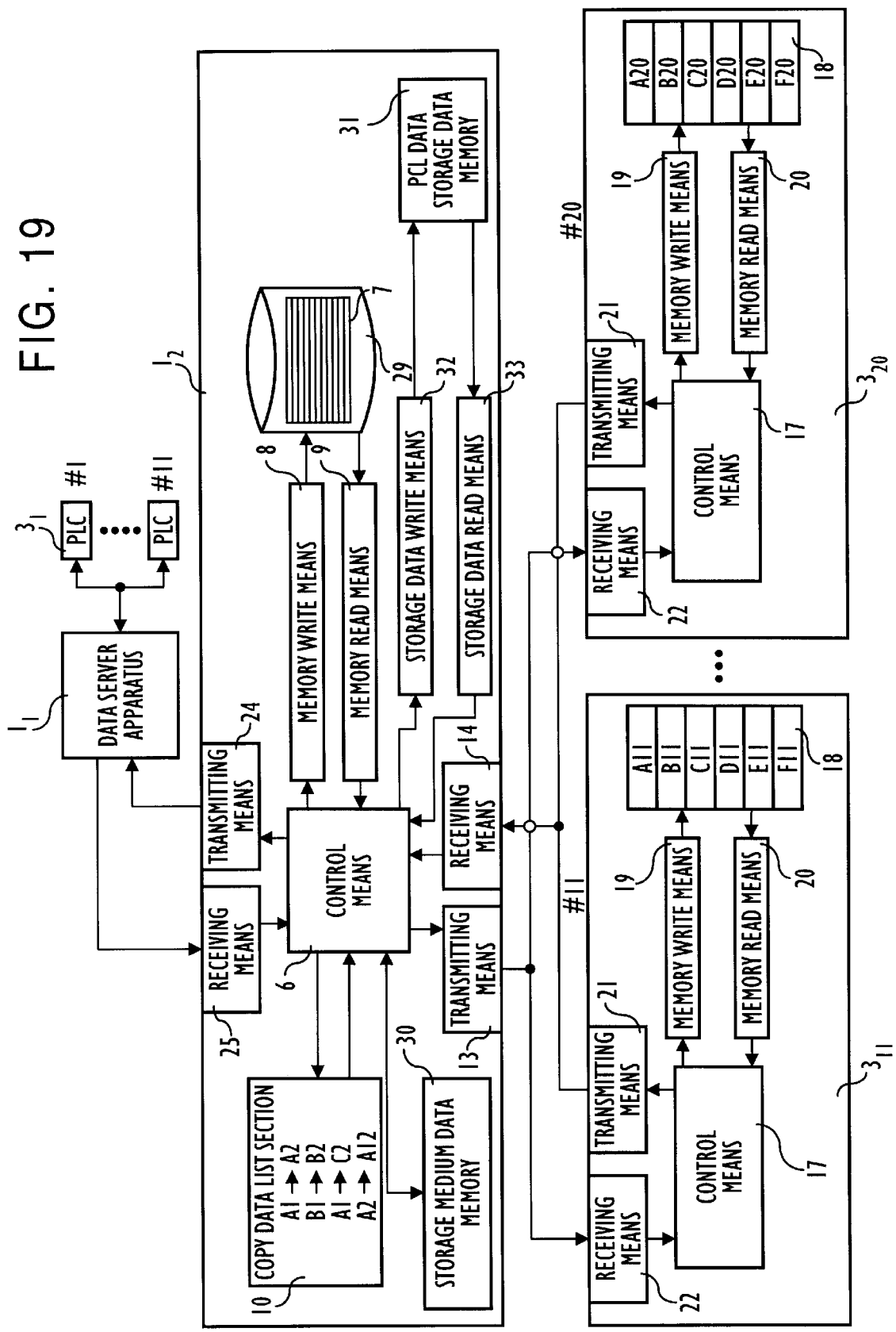
FIG. 19 is a block diagram showing Embodiment 4 of the network data server apparatus in the side with the FA controller according to the present invention not connected thereto.

FIG. 18 and FIG. 19 each show Embodiment 4 of the PLC system including the network data server apparatus according to the present invention. In this Embodiment 4, each of the network data server apparatuses $1_1$ and $1_2$ each has a storage medium data memory 30 for storing storage medium data such as a type of the storage medium 29 (e. g. a hard disk type magnetic storage medium, and a floppy disk type magnetic storage medium) constituting the memory 7 for PLC, its storage capacity, and its operating speed or the like; the PLC data storage data memory 31 for storing PLC data storage data for indicating which data the memory 7 for PLC stores; the write means 32 for writing PLC data storage data into the PLC data storage data memory 31; and the read means 33 for reading out PLC data storage data written into the PLC data storage data memory 31.

The control means 6 in the network data server apparatuses $1_1$ and $1_2$ each decide data to be stored in the memory 7 for PLC in its own unit according to the storage medium data written in the storage medium data memory 30, and provide controls to write data in the memory 7 for PLC in its own unit according to the decision above, and to transmit data to be written in the memory 7 for PLC of other network data server apparatus to other network data server apparatus with the transmitting means 24.

In addition, the control means 6 decides data to be stored in the memory 7 for PLC in its own unit according to the storage medium data written in the storage medium data memory 30, and provides controls to write PLC data storage data into the PLC data storage data memory 31 according to the decision above, to read out PLC data storage data corresponding to the received data from the PLC data storage data memory 31, and either to write the data into the memory 7 for PLC in its own unit or to transmit the data to other network data server apparatus.

Also, the control meas 6 periodically monitors a state of the storage medium 29, and updates storage medium data for the storage medium data memory 30.

As for setting reference for determination as to which data should be stored each in the memory 7 for PLC with which storage medium 29, there are two types of setting; setting by a maker and setting by a user.

In this case, the shorter a cycle time for changing and the higher the access frequency, the data with a quicker operation speed is selected in a range of the storage medium 29 in which a required storage capacity remains.

Next, a description is made for operations in Embodiment 4 with reference to FIG. 20 to FIG. 23.

Figure 20:
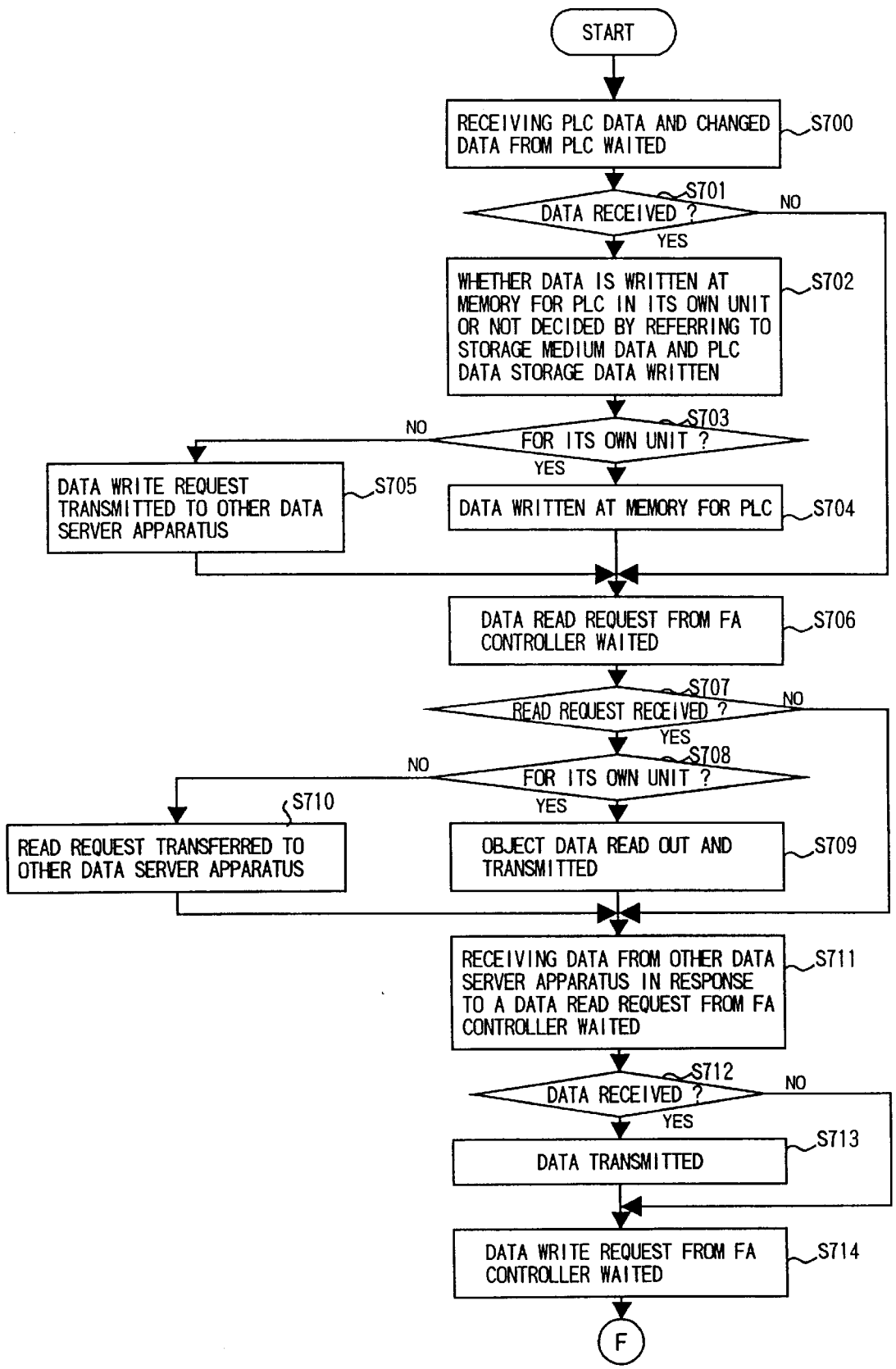
FIG. 20 is a flow chart showing a first half portion of an operation flow in Embodiment 4 of the network data server apparatus in the side with the FA controller according to the present invention connected thereto.
Figure 21:
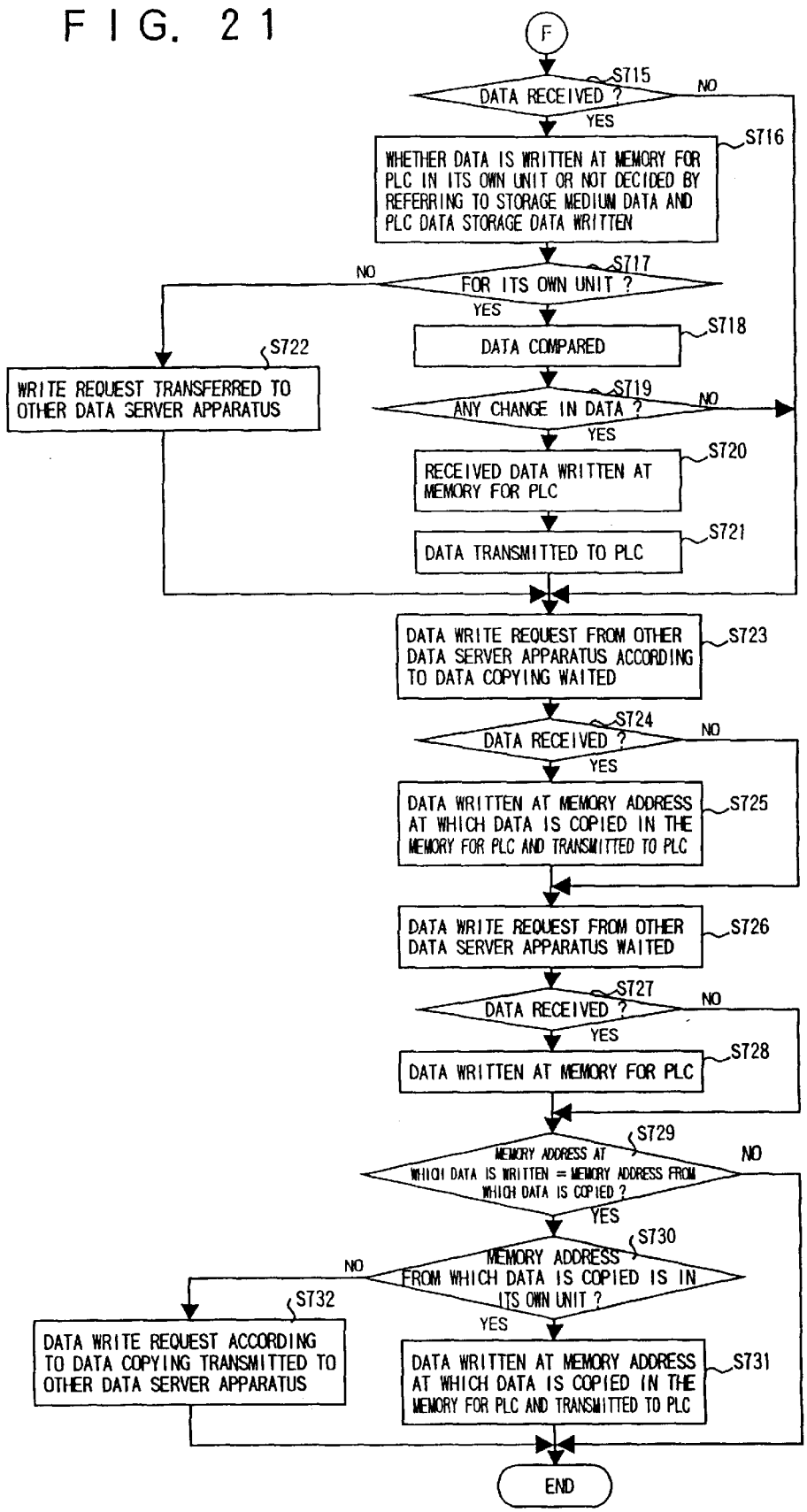
FIG. 21 is a flow chart showing a latter half portion of an operation flow in Embodiment 4 of the network data server apparatus in the side with the FA the FA controller according to the present invention not connected thereto.

FIG. 20 and FIG. 21 each show the operation flow in the network data server apparatus $1_1$. This operation flow is repeatedly executed once for each specified period of time, wherein, at first, the apparatus $1_1$ enters a state of waiting for receiving PLC data and data from the PLC connected to its own unit (the own network data server apparatus) (Step S700), and when the data is received (Step S701 affirmative), the apparatus 11 determines whether the data is the one to be stored in the memory 7 for PLC in its own unit according to PLC data and the storage medium data written in the storage medium data memory 30 storing PLC data or not, and writes the PLC data storage data indicating the PLC data being stored therein into the PLC data storage data memory 31 (Step S702).

It should be noted that, if PLC data storage data is already present in the PLC data storage data memory 31 and there is no change in storage medium data written in the storage medium data memory 30, Step S702 is omitted.

Then determination is made as to whether data from the PLC is the one to be written into the memory 7 for PLC in its own unit or not according to PLC data storage data written in the PLC data storage data memory 31 (Step S703).

If the data is the one to be written into the memory 7 for PLC in its own unit (Step S703 affirmative), the received data is written at the specified memory address of the memory 7 for PLC in its own unit (Step S704).

In contrast, if the data is not for being written into the memory 7 for PLC in its own unit (Step S703 negative), a data write request for transmitting the data above to other network data sever apparatus $1_2$ is transmitted to other network data server apparatus $1_2$ (Step S705).

Then a data read request from the FA controller 2 is waited (Step S706), and if a data read request is received (Step S707 affirmative), determination is made as to whether the request is for its own unit or not according to PLC storage data written in the PLC data storage data memory 31 (Step S708).

If the request is for its own unit (Step S708 affirmative), the object data for the read request is read out from the memory 7 for PLC in its own unit, and the data is transmitted to the FA controller 2 (Step S709).

In contrast, if the read request from the FA controller 2 is not for its own unit (Step S708 negative), the data read request received from the FA controller 2 with the network data server apparatus $1_1$ is transferred to other network data server apparatus $1_2$ (Step S710).

Then the apparatus $1_1$ enters a state of waiting for receiving data responding to the data read request from the FA controller 2, from other network data server apparatus $1_2$ (Step S711), when the data is received (Step S712 affirmative), the apparatus $1_1$ transmits the data to the FA controller 2 (Step S713).

Then the apparatus $1_1$ waits for a data write request from the FA controller 2 (Step S714), and when the write data is received (Step S715 affirmative), decides whether the data above is the one to be stored in the memory 7 for PLC in its own unit or not according to PLC data and storage medium data written in the storage medium data memory 30 storing PLC data, and writes PLC data storage data indicating the PLC data being stored therein into the PLC data storage data memory 31 (Step S716).

It should be noted that, also in this case, if PLC data storage data is already present in the PLC data storage data memory 31 and there is no change in storage medium data written in the storage medium data memory 30, Step S716 is omitted.

Then determination is made as to whether the data from the FA controller 2 is the one to be written in the memory 7 for PLC in its own unit or not according to the PLC data storage data written in the PLC data storage data memory 31 (Step S717).

If the data is for its own unit (Step S717 affirmative), the received data is compared to corresponding internal data in the memory 7 for PLC in its own unit (Step S718). In this comparison, if there is any change in data (Step S719 affirmative), new data (received data) from the FA controller 2 is written at the specified memory address of the memory 7 for PLC, and the data is transmitted to the PLC together with PLC data (Step S721).

In contrast, if the data write request from the FA controller 2 is not for its own unit (Step S717 negative), the data write request received from the FA controller 2 with the network data server apparatus $1_1$ is transferred to other network data server apparatus $1_2$ (Step S722).

Then the apparatus $1_1$ waits for a data write request from other network data server apparatus $1_2$ due to a result of data copying (Step S723), and when the write data is received (Step S724 affirmative), the apparatus $1_1$ writes the data at the memory address at which data is to be copied, in the memory for PLC in its own unit, and also transmits the data to the PLC connected to its own unit (Step S725).

Then the apparatus $1_1$ waits for a data write request from the network data server apparatus $1_2$ in order to effectively utilize the storage medium 29 (Step S726), and when the data is received (Step S727 affirmative), the apparatus $1_1$ writes the data into the memory 7 for PLC in its own unit (Step S728).

Then, in data write into the memory 7 for PLC, determination is made as to whether the memory address at which data is written is the memory address from which data is copied described in the copy data list section 10 or not (Step S729), and if the memory address at which data is written is the memory address from which data is copied described in the copy data list section 10 (Step S729 affirmative), determination is made as to whether the memory address from which data is copied is in its own unit or not according to PLC data storage data written in the PLC data storage data memory 31 (Step S730).

If the memory address from which data is copied is in its own unit (Step S730 affirmative), the data is written at the memory address at which data is to be copied in the memory 7 for PLC in its own unit, and the data is also transmitted to the PLC connected to its own unit (Step S731).

In contrast, if the memory address from which data is copied is not in its own unit (Step S730 negative), the data write request due to data copying is transmitted to other network data server apparatus $1_2$ (Step S732).

Figure 22:
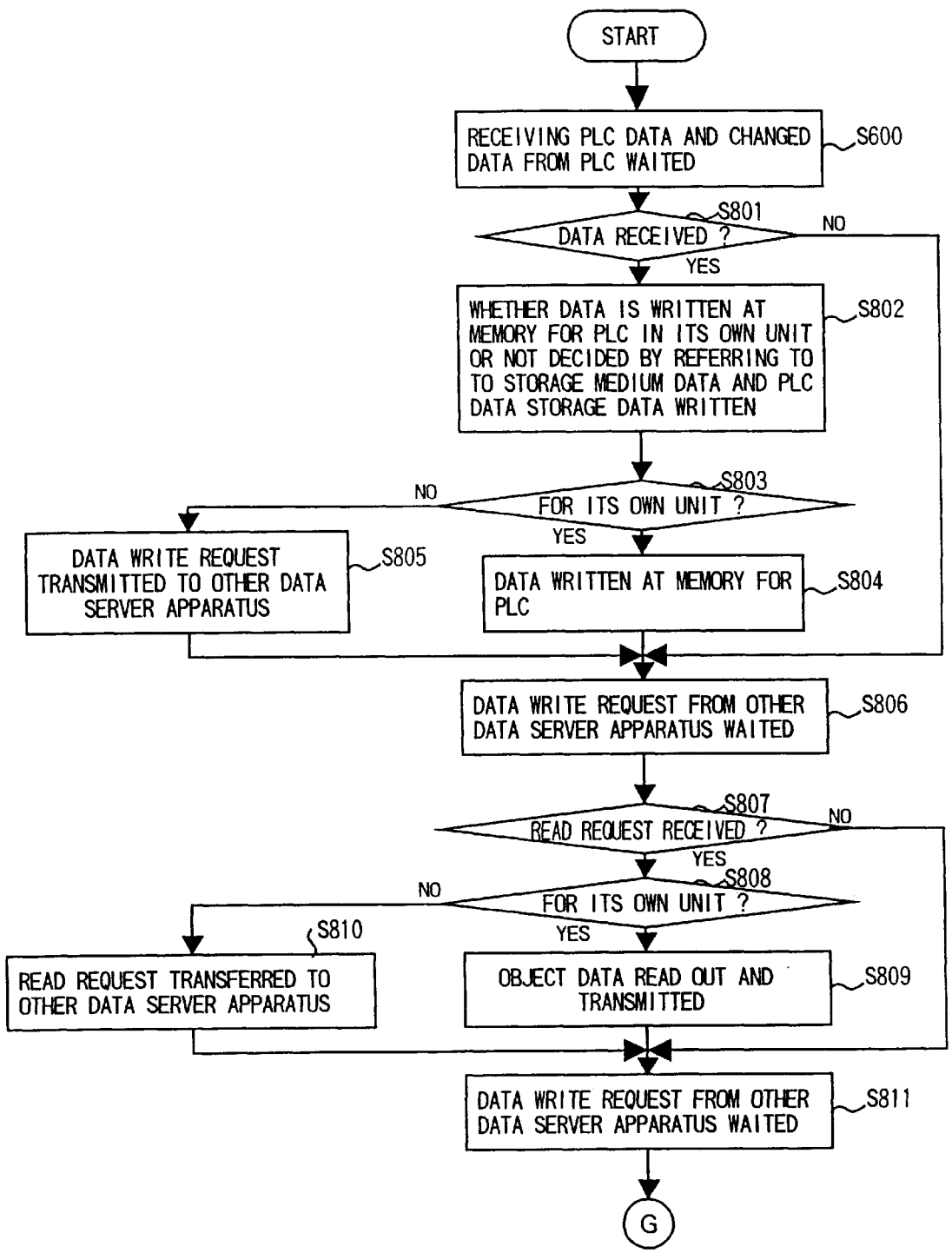
FIG. 22 is a flow chart showing a first half portion of the operation flow in Embodiment 4 of the network data server apparatus in the side with the FA controller according to the present invention not connected thereto.
Figure 23:
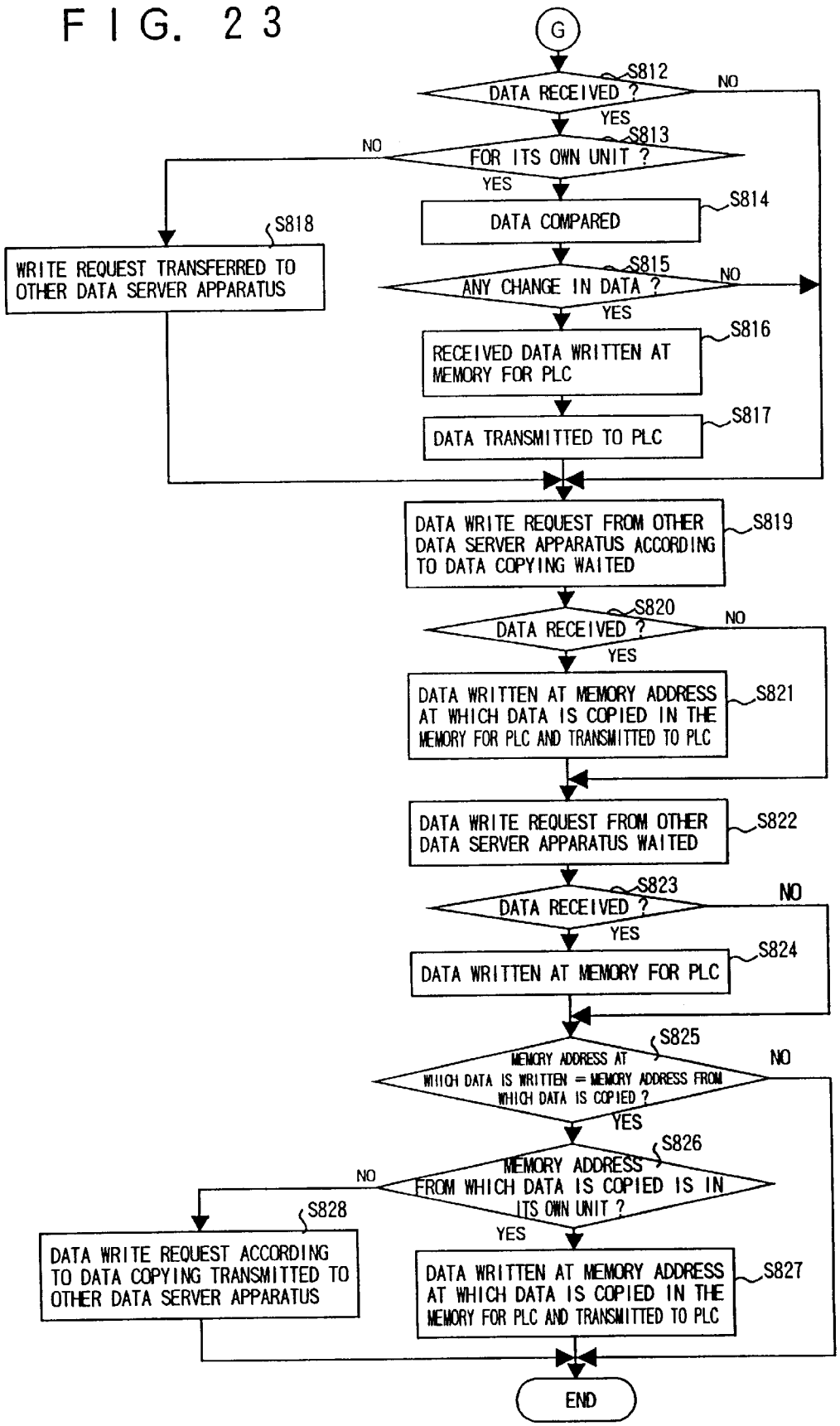
FIG. 23 is a flow chart showing the latter half portion of an operation flow in Embodiment 4 of the network data server apparatus in the side with the FA controller according to the present invention not connected thereto.

FIG. 22 and FIG. 23 each show an operation flow in the network data server apparatus $1_2$. This operation flow is repeatedly executed once for each specified period of time, wherein the apparatus $1_2$, at first, enters a state of waiting for receiving PLC data and data from the PLC connected to its own unit (Step S800), and when the data is received (Step S801 affirmative), the apparatus $1_2$ decides whether the data is the one to be stored in the memory 7 for PLC in its own unit or not according to PLC data and storage medium data written in the storage medium data memory 30 storing PLC data therein, and writes PLC data storage data indicating the PLC data being stored therein, into the PLC data storage data memory 31 (Step S802).

It should be noted that, also in this case, if PLC data storage data is already present in the PLC data storage data memory 31 and still there is no change in the storage medium data written in the storage medium data memory 30, Step S802 is omitted.

Then determination is made as to whether data from the PLC is the one to be written into the memory 7 for PLC or not according to the PLC data storage data written in the PLC data storage data memory 31 (Step S803).

If the data is the one to be written into the memory 7 for PLC in its own unit (Step S803 affirmative), the received data is written at the specified memory address of the memory 7 for PLC in its own unit (Step S804).

In contrast, if the data is not the one to be written into the memory 7 for PLC in its own unit (Step S803 negative), the data write request for transmitting the data to other network data server apparatus $1_2$ is transmitted to other network data server apparatus $1_2$ (Step S805).

Then the apparatus $1_2$ waits for a data read request from the FA controller 2 transferred from the network data server apparatus $1_1$ (Step S806), and when the data read request is received (Step S807 affirmative), determination is made as to whether the request is for its own unit or not according to the PLC data storage data written in the PLC data storage data memory 31 (Step S808).

If it is for its own unit (Step S808 affirmative), the object data for the read request is read out from the memory 7 for PLC in its own unit, and the data is transmitted to the network data server apparatus $1_1$ (Step S809).

In contrast, when the data read request from the FA controller 2 is not for its own unit (Step S808 negative), the data read request from the FA controller 2 transferred from the network data server apparatus $1_1$ is transferred further to other network data sever apparatus (Step S810).

Then the apparatus $1_2$ waits for a data write request from the FA controller 2 transferred from the network data server apparatus $1_1$ (Step S811), and when the write data is received (Step S812 affirmative), the apparatus $1_2$ determines whether the request is for its own unit or not according to the PLC data storage data written in the PLC data storage data memory 31 (Step S813).

If the data is for its own unit (Step S813 affirmative), the received data is compared to corresponding internal data in the memory 7 for PLC in its own unit (Step S814). In this comparison, if there is any change in data (Step S815 affirmative), new data (received data) from the FA controller 2 is written at the specified memory address in the memory 7 for PLC (Step S816), and the data is also transmitted to the PLC together with PLC data (Step S817).

In contrast, when the data write request from the FA controller 2 is not for its own unit (Step S813 negative), the data write request from the FA controller 2 transferred from the network data server apparatus $1_1$ is transferred further to other network data server apparatus (Step S818).

Then the apparatus $1_2$ waits for a data write request from other network data server apparatus $1_1$ due to a result of data copying (Step S819), and when the write data is received (Step S820 affirmative), the apparatus $1_2$ writes the data at the memory address at which data is to be copied in the memory for PLC in its own unit, and also the data is transmitted to the PLC connected to its own unit (Step S821).

Then the apparatus $1_2$ waits for a data write request from the network data server apparatus $1_1$ in order to effectively utilize the storage medium 29 (Step S822), and when the data is received (Step S823 affirmative), the apparatus $1_2$ writes the data into the memory 7 for PLC in its own unit (Step S824).

Then, in data write into the memory 7 for PLC, determination is made as to whether the memory address at which data is written is the memory address from which data is copied described in the copy data list section 10 or not (step S825), and if the memory address at which data is written is the memory address from which data is copied described in copy data list section 10, determination is made as to whether the memory address from which data is copied is in its own unit or not according to the PLC data storage data written in the PLC data storage data memory 31 (Step S826).

If the memory address from which data is copied is in its own unit (Step S826 affirmative), the data is written at the memory address at which data is to be copied in the memory for PLC in its own unit, and the data is also transmitted to the PLC connected to its own unit (Step S827).

In contrast, if the memory address from which data is copied is not in its own unit (Step S826 negative), the data write request due to a result of data copying is transmitted further to other network data server apparatus 11 (Step S828).

In Embodiment 4, data suited to characteristics of the storage medium 29 constituting the memory 7 for PLC is selected for each memory 7 for each PLC and is written into the memory 7 for PLC. With this feature, for instance, data having a short cycle time for changing is written into a memory of the storage medium 29 with a quick operating speed, while data having a long cycle time for changing is written into the memory of the storage medium 29 with a slow at its operating speed, and for this reason effective utilization of memory resources and improvement in performance of the whole system can be achieved.

Figure 24:
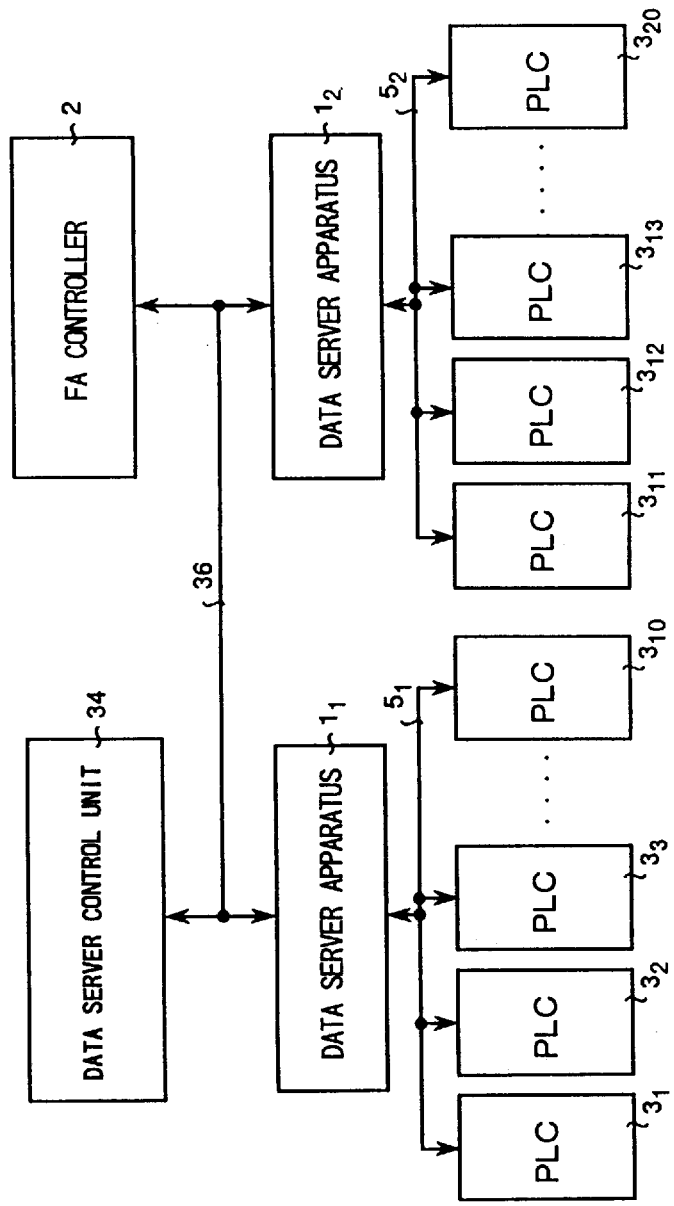
FIG. 24 is a general block diagram showing an embodiment of the programmable logic controller system according to the present invention.
Figure 25:
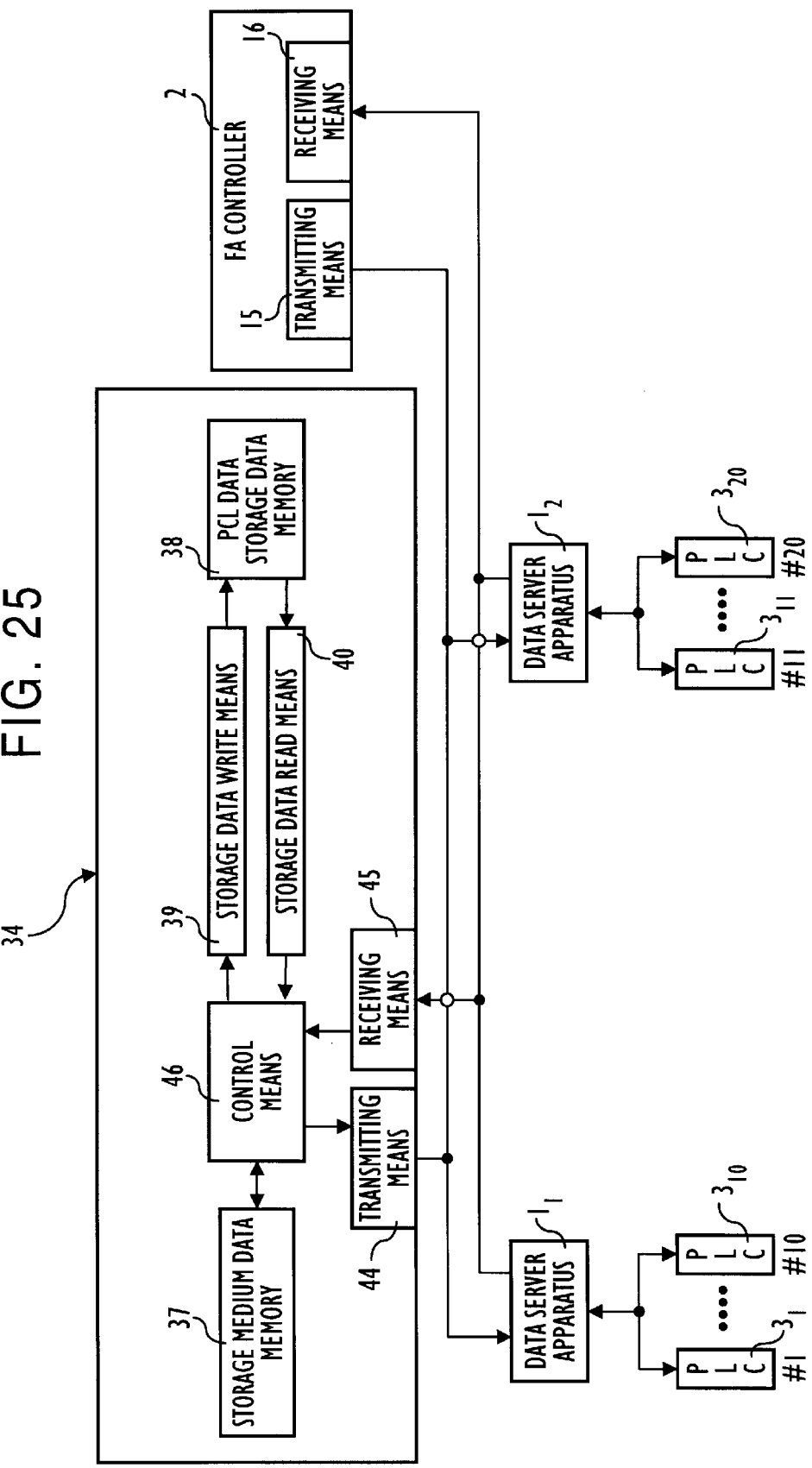
FIG. 25 is a block diagram showing an embodiment of the data server control unit in the programmable logic controller system according to the present invention.
Figure 26:
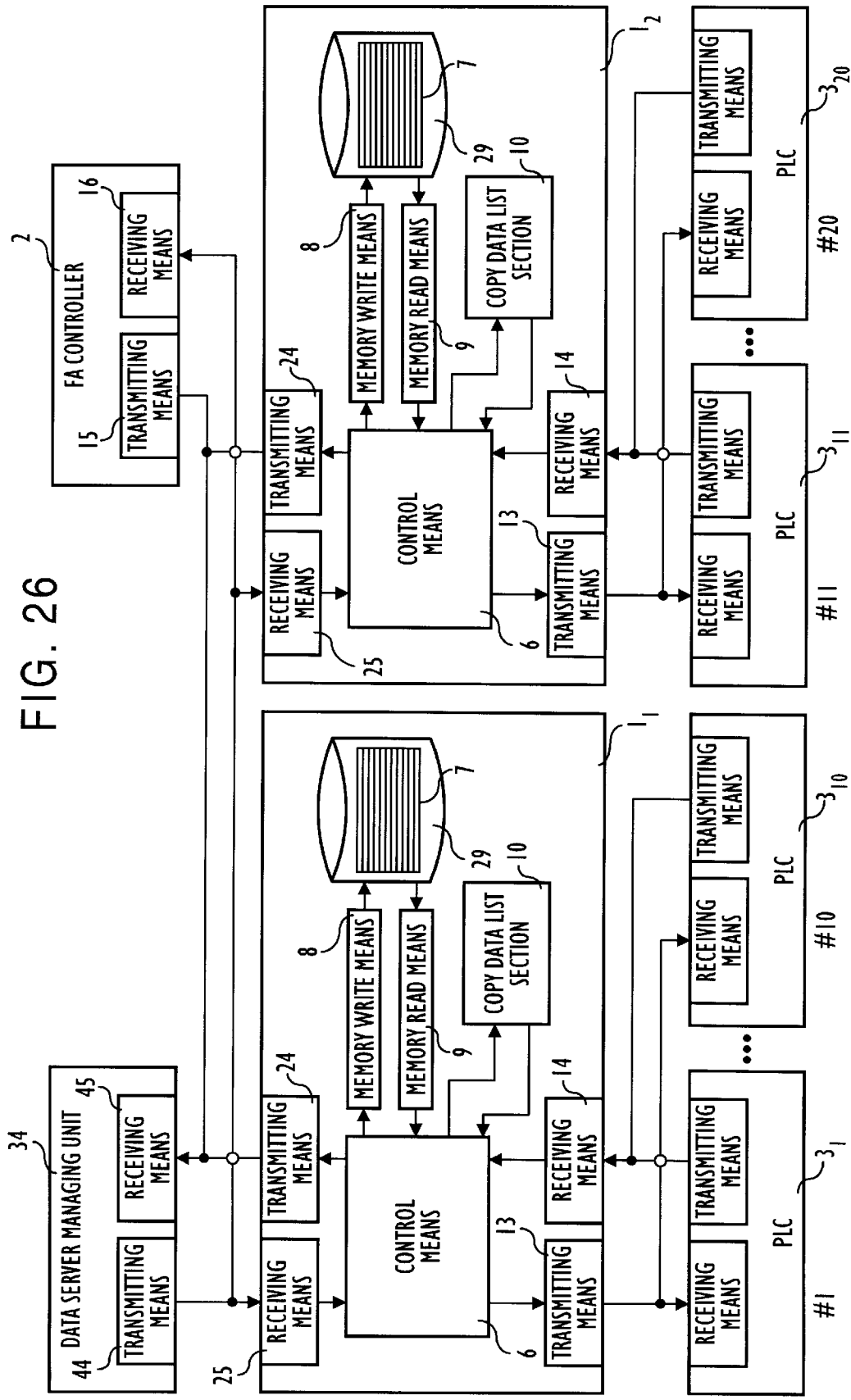
FIG. 26 is a block diagram showing an embodiment of the network data server apparatus in the programmable logic controller system according to the present invention.

FIG. 24 to FIG. 26 show Embodiment 5 of the PLC system including therein the network data server apparatus according to the present invention. In Embodiment 5, the network data server apparatuses $1_1$ and $1_2$ are connected to each other through the communication path 36 in a manner enabling bidirectional communications and also through the communication path 36, the data server control unit 34 and the FA controller 2 are connected to the network data server apparatuses $1_1$ and $1_2$ respectively in a manner enabling bidirectional communications. The network data server apparatus $1_1$ and $1_2$ are connected to PLCs $3_1$ to $3_{10}$ and $3_{11}$ to $3_{20}$ through the communication paths $5_1$ and $5_2$ respectively like in the embodiment described above in a manner enabling bidirectional communications network data server apparatuses $1_1$ and $1_2$ are connected to each other through the communication path 36 in a manner enabling bidirectional communications and also through the communication path 36, the data server control unit 34 and the FA controller 2 are connected to the network data server apparatuses $1_1$ and $1_2$ respectively in a manner enabling bidirectional communications. The network data server apparatus $1_1$ and $1_2$ are connected to PLCs $3_1$ to $3_{10}$ and $3_{11}$ to $3_{20}$ through the communication paths $5_1$ and $5_2$ respectively like in the embodiment described above in a manner enabling bidirectional communications.

As shown in FIG. 25, the data server control unit 34 has a storage medium data memory 37 for storing monolithically storage medium data such as a type, a storage capacity, and an operating speed of the storage medium 29 constituting the memory 7 for PLC in each of the network data server apparatuses $1_1$ and $1_2$; the PLC data storage data memory 38 for writing therein the data for determining which PLC data is to be stored in each of the network data server apparatuses $1_1$ and $1_2$; a storage data write means 39 for writing PLC data storage data into the PLC data storage data memory 38; a storage data read means 40 for reading out PLC data storage data written in the PLC data storage data memory 38; a transmitting means 44 as well as receiving means 45 for transaction with each of the network data server apparatuses $1_1$ and $1_2$ as well as the FA controller 2; and a control means 46 for controlling operations of each means described above.

The control means 46 distributes and allocates the data to the network data server apparatuses $1_1$ and $1_2$ each for storing therein the data according to the storage medium data written in the storage medium data memory 37; writes the PLC data storage data decided through distributed allocation above with the write means 39 into the PLC data storage data memory 38; reads out corresponding PLC data storage data each time communication inquiring destination for storing the data from the network data server apparatus $1_1$ and $1_2$ or the FA controller 2 is executed from the PLC data storage data memory 38 to decide the destination for storage of the data; and transmits the data concerning the destination for data storage to a station having issued the inquiry.

Also, the control means 46 cyclically communicates with the network data server apparatuses $1_1$ and $1_2$ to monitor a state of the storage medium 29, and updates the storage medium data for the storage medium data memory 37.

The network data server apparatuses $1_1$ and $1_2$ in this embodiment are the ones in which storage medium data memory 30 and PLC data storage data memory 31 are omitted from the network data server apparatus $1_1$ in Embodiment 4.

The control means 6 in the network data server apparatuses $1_1$ and $1_2$ each execute communication inquiring destination for storing data with the data server control unit 34, each time upon receiving data from the PLC, and provides a control either to write the received data into the memory 7 for PLC in the network data server apparatus, or to transmit the data to other network data server apparatus according to a reply from the data server control unit 34.

This embodiment is characterized in that, different from Embodiment 4, the data server control unit 34 provides controls monolithically to decide in which memory 7 for PLC in each of the data server apparatuses $1_1$ and $1_2$ PLC data is to be stored, namely to distribute and allocate data to network data server apparatuses each for storing the data and to determine in which of the network data server apparatuses each PLC data is to be stored.

Figure 27:
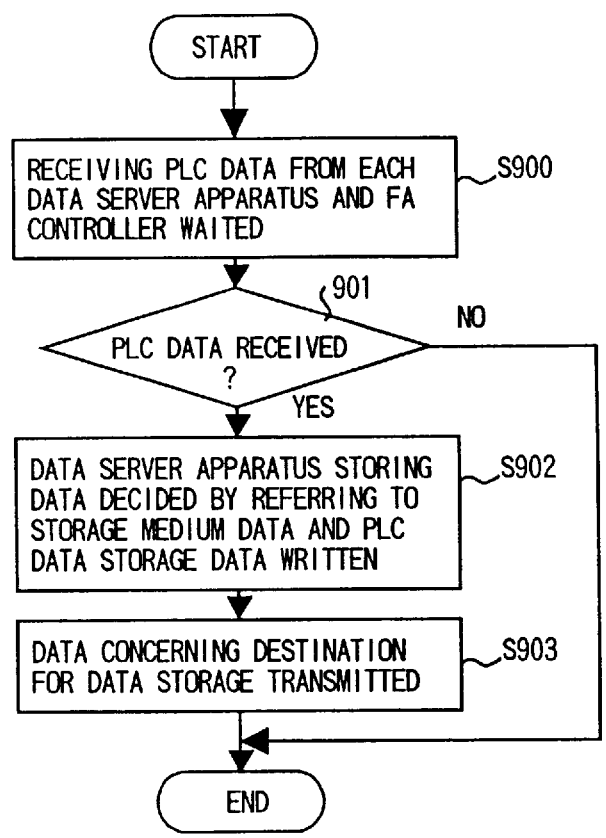
FIG. 27 is a flow chart showing an operation flow of the data server control unit in the programmable logic controller system according to the present invention.
Figure 28:
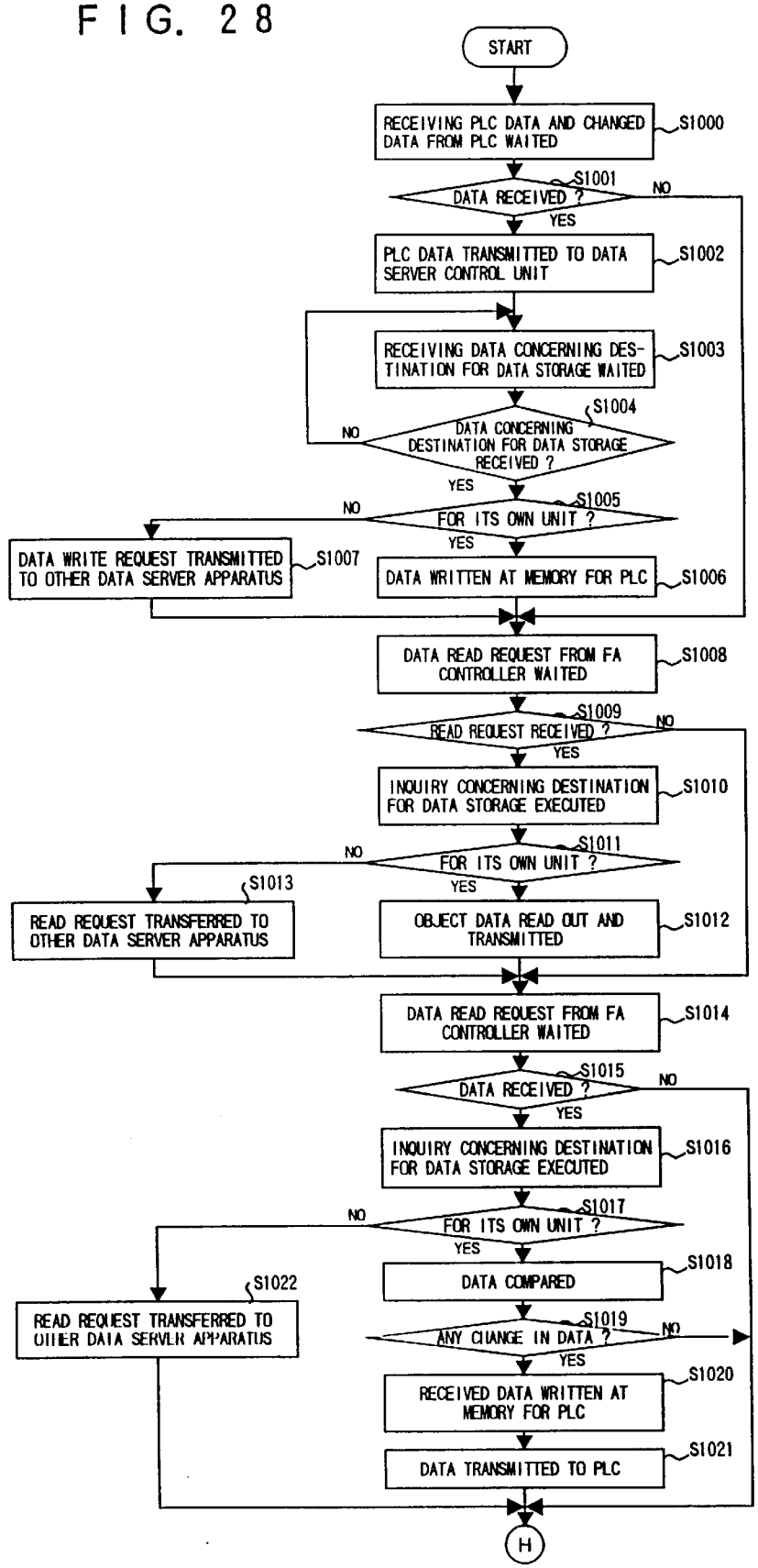
FIG. 28 is a flow chart showing the first half portion of an operation flow of the network data server apparatus in the programmable logic controller system according to the present invention.
Figure 29:
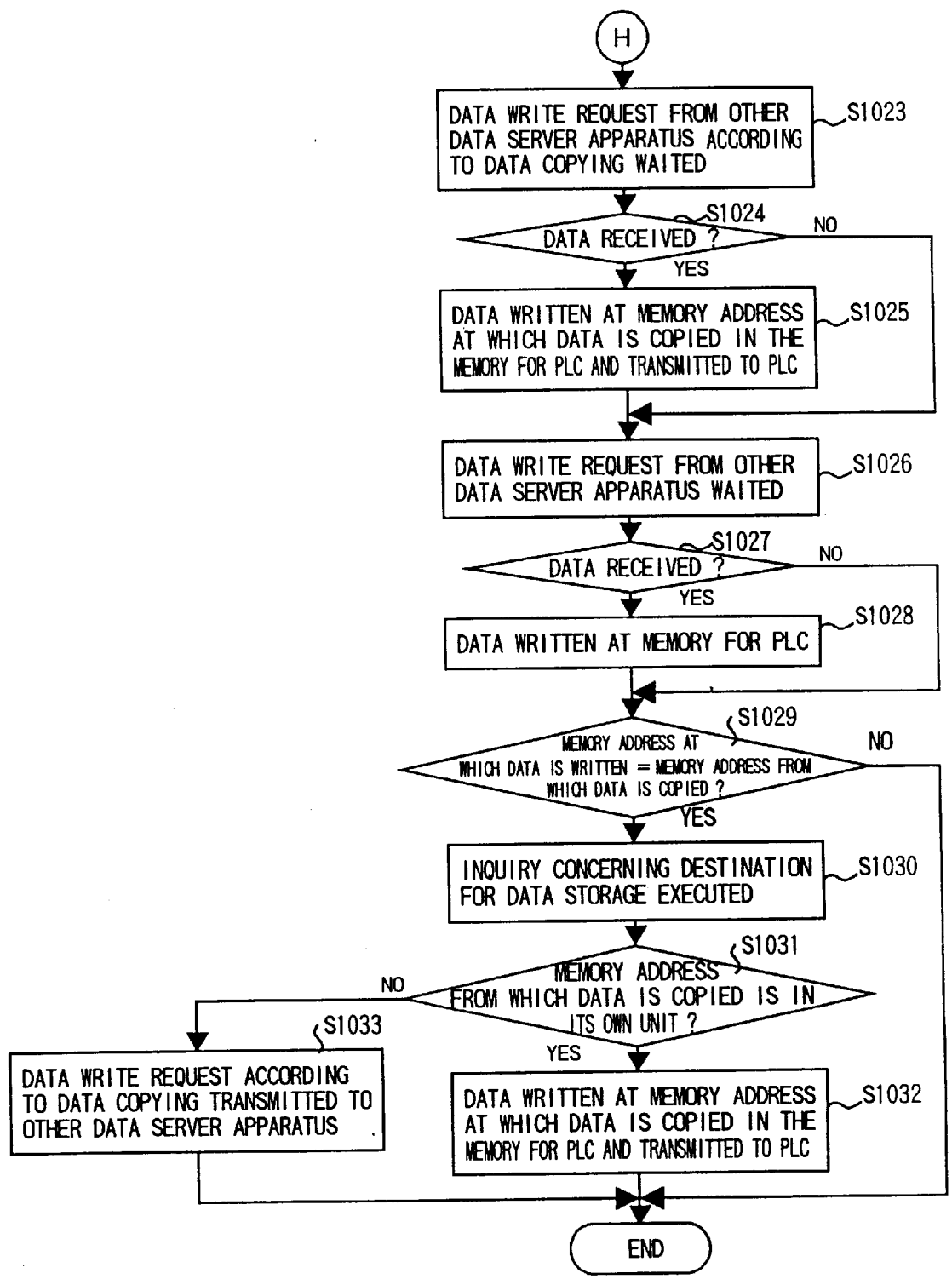
FIG. 29 is a flow chart showing the latter half portion of the operation flow of the network data server apparatus in the programmable logic controller system according to the present invention.
Figure 30:
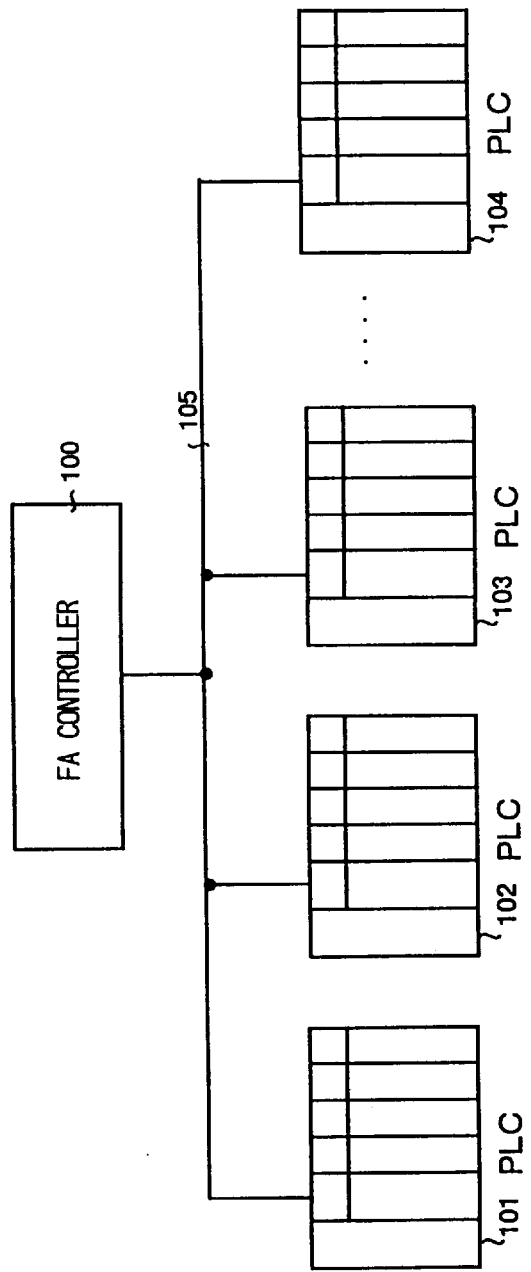
FIG. 30 is a block diagram showing an embodiment of the conventional type of programmable logic controller system.

Next, a description is made for operations in Embodiment 5 with reference to FIG. 27 to FIG. 29.

FIG. 27 shows an operation flow in the data server control unit 34.

This operation flow is repeatedly executed once for each specified period of time, wherein, at first, the unit 34 enters a state of waiting for receiving PLC data each from the network data server apparatuses $1_1$ and $1_2$, and the FA controller 2, namely a state of waiting for inquiring destination for storing the data (Step S900), and when the PLC data is received (Step S901 affirmative), the units 34 decides in which of the network data server apparatuses $1_1$ and $1_2$ data is to be stored, and writes the PLC data storage data indicating in which of the network data server apparatuses each PLC data is stored into the PLC data storage data memory 38 (Step S902).

It should be noted that, if PLC data storage data is already present in the PLC data storage data memory 38 and there is no change in the storage medium data written in the storage medium data memory 37, Step S902 is omitted.

Then PLC data storage data is read out from the PLC data storage data memory 38, and the PLC data storage data is transmitted to a station having issued the inquiry concerning the destination for data storage (Step S903).

FIG. 28 and FIG. 29 show an operation flow in the network data server apparatuses $1_1$ and $1_2$. This operation flow is repeatedly executed once for each specified period of time, wherein, at first, each of the apparatuses $1_1$ and $1_2$ enters a state of waiting for receiving PLC data and data from the PLC connected to its own unit (the own network data server apparatus) (Step S1000), and when the data is received (Step S1001 affirmative), the apparatus $1_1$ and $1_2$ transmits the PLC data to the data server control unit 34 as an inquiry concerning destination for data storage (Step S1002).

Then the apparatus enters a state of waiting for receiving data concerning destination for data storage from the data server control unit 34 (Step S1003), and when data concerning destination for data storage is received (Step S1004 affirmative), determination is made as to whether the data from the PLC is the one to be written into the memory 7 for PLC in its own unit or not according to the received data concerning destination for data storage (Step S1005).

If the data is the one to be written into the memory 7 for PLC in its own unit (Step S1005 affirmative), the received data is written at the specified memory address of the memory 7 for PLC.

In contrast, when the data is not the one to be written into the memory 7 for PLC in its own unit (Step S1005 negative), the data write request for transmitting the data to other network data server apparatus $1_2$ is transmitted further to other network data server apparatus $1_2$ (Step S1007).

Then the apparatus waits for a data read request from the FA controller 2 (Step S1008), and when the data read request is received (Step S1009 affirmative), transmits PLC data for the data to the data server control unit 34, and executes inquiry concerning destination for data storage (Step S1010).

Then determination is made as to whether data for the read request from the FA controller 2 is the one to be written into the memory 7 for PLC in its own unit or not according to the data concerning destination for data storage from the data server control unit 34 (Step S1011), and if the request is for its own unit (Step S1011 affirmative), the object data for the read request is read out from the memory 7 for PLC in its own unit, and the data is transmitted to the FA controller 2 (Step S1012).

In contrast, if the data read request from the FA controller 2 is not for its own unit (Step S1011 negative), the data read request received from the FA controller 2 with the network data server apparatus $1_1$ is transferred to other network data server apparatus $1_2$ (Step S1013).

Then the apparatus waits for a data write request from the FA controller 2 (Step S1014), and when write data is received (Step S1015 affirmative), the apparatus transmits PLC data for the data to the data server control unit 34 and executes inquiry concerning destination for data storage (Step S1016).

Then determination is made as to whether data for the write request from the FA controller 2 is the one to be written into the memory 7 for PLC in its own unit or not according to the data concerning destination for data storage from the data server control unit 34 (Step S1017), and if the request is for its own unit (Step S1017 affirmative), the received data is compared to corresponding internal data in the memory 7 for PLC in its own unit (Step S1018). In this comparison, if there is any change in the data (Step S1019 affirmative), new data (received data) from the FA controller 2 is written into the specified memory address in the memory 7 for PLC (Step S1020), and the data is also transmitted to the PLC together with PLC data (Step S1021).

In contrast, when the write request from the FA controller 2 is not for its own unit (Step S1017 negative), the data write request from the FA controller 2 is transferred further to other network data server apparatus (Step S1022).

Then the apparatus waits for a data write request from other network data server apparatus 12 due to a result of data copying (Step S1023), and if write data is received (Step S1024 affirmative), the apparatus writes the data at the memory address at which data is to be copied in the memory for PLC in its own unit, and also transmits the data to the PLC connected to its own unit (Step S1025).

Then the apparatus waits for a data write request from other network data server apparatus (Step S1026), and when data is received (Step S1027 affirmative), the apparatus writes the data into the memory 7 for PLC in its own unit (Step S1028).

Then in data write into the memory 7 for PLC, determination is made as to whether the memory address at which data is written is the memory address from which data is copied described in the copy data list section 10 (Step S1029) or not, and if the memory address at which data is written is the memory address from which data is copied described in the copy data list section 10 (Step S1029 affirmative), PLC data for the data is transmitted to the data server control unit 34, and inquiry concerning destination for data storage is executed (Step S1030).

Then determination is made as to whether the memory address from which data is copied is for its own unit or not according to the data concerning destination for data storage from the data server control unit 34 (Step S1031).

If the memory address from which data is copied is in its own unit (Step S1031 affirmative), the data is written at the memory address at which data is to be copied in the memory 7 for PLC in its own unit, and the data is also transmitted to the PLC connected to its own unit (Step S1032).

In contrast, if the memory address from which data is copied is not in its own unit (Step S1031 negative), the data write request due to a result of data copying is transmitted to other network data server apparatus $1_2$ (Step S1033).

In Embodiment 5, data suited to characteristics in the storage medium 29 constituting the memory 7 for PLC is selected each for the memory 7 for PLC and the data is written into the memory 7 for PLC. With this feature, data having a short cycle time for changing is written into the memory of the storage medium 29 with a quick operating speed, while data having a long cycle time for changing is written into the memory of the storage medium 29 with a slow operating speed, then effective utilization of memory resources and improvement in performance of the whole system can be achieved, and controls of distributed allocation of the network data server apparatus for storing data and of data copying between the network data server apparatuses are provided monolithically in the data server control unit, for this reason, efficiency of the whole system can be improved without lowering the processing capacity of each data server as compared to the case where these processings are executed respectively in each network data server apparatus.

As described above, in the network data server apparatus according to the present invention, data is written in the memory according to transmitting/receiving data to/from the program processing means connected to the network data server apparatus and data for the program processing means is controlled monolithically in the network data server apparatus, so that a read/write request for data for the program processing means is executed only to the network data server apparatus, and for this reason responsivity to reading/writing the data is improved. Also when a read/write request is outputted to a plurality of program processing means according to data for the program processing means which is controlled monolithically in the network data server apparatus, it is not necessary to output a read/write request to each program processing means, for this reason processing for programming becomes easier.

When data is copied, data for the program processing means written in a memory address which is one of the memories is read out from the memory with the read means and the data is written into a memory address in the memory storing data for other program processing means with the write means according to memory addresses from which data is copied and those at which data is copied, each described in the copy data list section, and data copying is accurately executed with a quick response and without depending on the program processing means, so that the work load to a program processing means is reduced. Also it is not necessary to incorporate the program for data copying between program processing means into a program processing means.

In another network data server apparatus according to the present invention, data for PLC is written into the memory for PLC by means of transmitting data to and receiving data from each PLC connected to the network data server apparatus and data for each PLC is controlled monolithically in the network data server apparatus, so that a read/write request for data for PLC from the FA controller is issued only to the network data server apparatus, and for this reason response capability to read/write of the data is improved. Also data for each PLC is controlled monolithically in the network data server apparatus, so that when the FA controller outputs a read/write request to a plurality units of PLC, it is not necessary to output the read/write request to each PLC, and for this reason processing such as programming becomes easier.

When data is copied, according to memory addresses from which data is copied and those at which data is copied, each described in the copy data list section, data for the programmable logic controller written at a memory address in a memory for PLC is read out from the memory for PLC with the read means, the data is written at a memory address in the memory for PLC storing data for other programmable logic controller with the write means, and data copying is accurately executed with a quick response and without depending on the FA controller, so that a work load to the FA controller is reduced, and even when the system for the FA controller is changed, a production line or the like can be kept operating as usual. In this case, the FA controller executes only processing for changing parameters, and is not required to store address data for PLC, and for this reason, memory resources in the FA controller is saved. In addition, a program for data copying between PLCs is not required to be incorporated into the PLC.

In another network data server apparatus according to the present invention, data copying is executed in an extended range between network data server apparatuses according to memory addresses from which data is copied and those at which data is copied, each described in the copy data list section, so that the data copying between network data server apparatuses is accurately executed with a quick response and without depending on any task of the FA controller, and for this reason, a work load to the FA controller is reduced.

In another network data server apparatus according to the present invention, data communication between the FA controller and the network data server apparatus is executed by referring to list contents in the connected PLC list section stored in the network data server apparatus, so that the FA controller is not required to store communication address data for the network data server apparatus, and transparent data transmission with each of the network data server apparatuses is executed without being aware of which network data server apparatus the PLC is connected to.

In another network data server apparatus according to the present invention, data to be written in the memory for PLC is made duplicated, so that even if one data is destroyed, a back up therefor is executed with the other data, and for this reason reliability of the system is improved.

In another network data server apparatus according to the present invention, data suited to characteristics such as operating speed of the storage medium constituting the memory for PLC is selected for each memory for each PLC, and the data is written into the memory for PLC, so that memory resources are effectively utilized and efficiency of the entire system is improved.

In another programmable logic control system according to the present invention, data suited to characteristics of the storage medium constituting the memory for PLC is selected for each memory for each PLC, and the data is written into the memory for PLC, so that data having a short cycle time for changing is written into the memory of the storage medium with a quick operating speed, while data having a long cycle time for changing is written into the memory of the storage medium with a slow operating speed, and effective utilization of memory resources and improvement in performance of the whole system can be achieved, and also distributed allocation of the network data server apparatus storing data and control for data copying between network data server apparatuses are executed monolithically in the data server control unit, for this reason efficiency of the whole system can be improved without reducing processing capability for each data server as compared to a case where these processing are executed individually in each of the network data server apparatuses.

What is claimed is:

1. A network data server apparatus connected to a first program processing means and a second program processing means in a manner enabling bidirectional communications, the network data server apparatus comprising:

a memory for storing, at specified memory addresses therein, data from the first program processing means;

a receiving means for receiving data transmitted from the first program processing means;

a write means for writing to said memory data received by said receiving means;

a read means for reading out data written in said memory;

a transmitting means for transmitting data read out by said read means to the second program processing means;

a copy data list section which contains a correspondence of memory addresses from which data is copied and memory addresses to which data is copied; and a control means for causing said read means to read out from said memory, as copy data, data located at said memory addresses from which data is copied, according to the correspondence contained in said copy data list section, and causing said write means to write the copy data into said memory at said memory addresses to which data is copied, according to the correspondence contained in said copy data list section.

2. A network data server apparatus connected to a plurality of programmable logic controller units (PLCs) and at least one FA controller unit in a manner enabling bidirectional communications, the network data server apparatus comprising:

a PLC memory for storing data for each of said plurality of programmable logic controller units at respective memory addresses;

a receiving means for receiving data transmitted from any one of said plurality of programmable logic controller units or from said FA controller unit;

a write means for writing into said PLC memory data received by said receiving means;

a read means for reading data stored in said PLC memory;

a transmitting means for transmitting the data read out by said read means to any of said plurality of programmable logic controller units or to said FA controller unit;

a copy data list section which contains a correspondence of memory addresses from which data is copied and memory addresses to which data is written for data copying; and a control means for causing said read means to read out from said PLC memory, as copy data, data stored at said memory addresses from which data is copied, according to the correspondence contained in said copy data list section, and causing said write means to write the copy data into said PLC memory at said memory addresses to which data is copied, according to the correspondence contained in said copy data list section.

3. The network data server apparatus according to claim 2, wherein the network data server apparatus has a network transmitting means and a network receiving means for providing bidirectional communications between the network data server apparatus and other network data server apparatuses, wherein said copy data list section includes a section in which a correspondence of memory addresses from which data is copied and memory addresses to which the data is written are contained, said correspondence being arranged for copying data between different network data server apparatuses, and wherein said control means executes data copying through said transmitting means and said receiving means between the network data server apparatus and said other network data server apparatuses according to the memory addresses from which data is copied and the memory addresses at which data is written, in said copy data list section.

4. The network data server apparatus according to claim 2, further comprising:

a network transmitting and receiving means for bidirectional communications between the network data server apparatus and other network data server apparatuses, each of said other network data server apparatuses being connected to at least one respective programmable logic controller unit and to one or more respective FA controller units, and a connected PLC list section for storing a list of programmable logic controllers connected to the network data server apparatus, wherein said control means determines whether a data read/write request received from one of said at least one FA controller units is applicable to any of said plurality of programmable logic controller units connected to the network data server apparatus by referring to list contents of said connected PLC list section, executes the request by itself if the data read/write request is for one of said plurality of programmable logic controller units connected to the network data server apparatus, and transfers the data read/write request via said network transmitting and receiving means to one of said other network data server apparatuses if the data read/write request is not for one of said plurality of programmable logic controller units connected to the network data server apparatus.

5. The network data server apparatus according to claim 2, further comprising:

a network transmitting and receiving means for bidirectional communications between the network data server apparatus and other network data server apparatuses, each of said other network data server apparatuses being connected to at least one respective programmable logic controller unit, and a supplementary PLC memory for storing therein data for the programmable logic controller units connected respectively to said other network data server apparatuses;

wherein said control means controls said network transmitting and receiving means to transmit or receive data for one or more of the programmable logic controller units connected respectively to one of said other network data server apparatuses and writes the data thus received with said write means into said supplementary PLC memory.

6. The network data server apparatus according to claim 2, further comprising:

a network transmitting and receiving means for bidirectional communications between the network data server apparatus and other network data server apparatuses, each of said other network data server apparatuses being connected to at least one respective programmable logic controller unit, a storage medium data memory for storing therein storage medium data such as a type, a memory capacity, and an operating speed of storage media each constituting said PLC memory, a PLC data storage data memory for storing therein PLC data storage data indicating which data is stored in said PLC memory, a means for writing the PLC data storage data into said PLC data storage data memory, and a means for reading out the PLC data storage data written in said PLC data storage data memory;

wherein said control means provides controls to decide data to be stored in the PLC memory of the network data server apparatus according to the storage medium data written in said storage medium data memory, to cause said means for writing the PLC data storage data to write the PLC data storage data into said PLC data storage data memory according to the decision, to cause said means for reading out the PLC data storage data to read out the PLC data storage data corresponding to the received data from said PLC data storage data memory, and to determine whether the data should be written in the PLC memory of the network data server apparatus or transmitted to one of said other network data server apparatuses.

7. A programmable logic controller system including:

a plurality of network data server units, each of said network data server units being connected to a respective plurality of programmable logic controllers in a manner enabling bidirectional communications, and each of said network data server units being connected to a respective data server control unit in a manner enabling bidirectional communications, wherein each respective data server control unit is connected to at least one FA controller in a manner enabling bidirectional communications;

each of said plurality of network data server units comprises:

a PLC memory for storing data for the respective plurality of programmable logic controllers at specified memory addresses, a receiving means for receiving data transmitted from one of said plurality programmable logic controllers or from said respective data server control unit, a write means for writing data received by said receiving means into said PLC memory, a read means for reading data stored in said PLC memory, a transmitting means for transmitting the data read out by said read means to one of said plurality of programmable logic controllers or to said data server control unit, a transmitting and receiving means for bidirectional communications between said plurality of network data server units, a copy data list section containing a correspondence of memory addresses from which data is copied, and memory addresses to which data is copied, and a control means for executing communications with said respective data server control unit inquiring a destination for data storage each time data is received from one of said plurality of programmable logic controllers, deciding whether the received data is to be written in the PLC memory or is to be transmitted to another network data server apparatus according to a reply from said data server control unit, reading out copy data stored in said PLC memory at said memory addresses from which data is copied with said read means according to the correspondence contained in said copy data list section, and writing the copy data to said PLC memory at said memory addresses to which data is copied with said write means according to the correspondence contained in said copy data list section;

wherein each of said respective data server control units comprises:

a storage medium data memory for storing therein storage medium data such as a type, storage capacity, and operating speed of each memory medium constituting said PLC memory in each one of said plurality of network data server units, a PLC data storage data memory for storing therein PLC data storage data indicating which data is stored in said PLC memory of the respective one of said plurality network data server units, a means for writing the PLC data storage data into said PLC data storage data memory, a means for reading the PLC data storage data written in said PLC data storage data memory, and a control means for providing controls to distribute and allocate data among the plurality of network data server units, to write the PLC data storage data into said PLC storage data memory according to the distributed allocation of data with said write means to read out corresponding PLC data storage data from said PLC data storage data memory each time a communication inquiring destination for storing data is received from said network data server apparatus or said FA controller is executed, decide the destination for storage of the data, and transmit the data concerning the destination for data storage to a station having issued the inquiry; wherein each of said plurality of network data server units stores data in the respective PLC memory according to the memory medium data written in said memory medium data memory and.

* * * * *